: US009523539B2

United States Patent
Ide et al.

(10) Patent No.: US 9,523,539 B2
(45) Date of Patent: Dec. 20, 2016

(54) LATENT HEAT STORAGE MEMBER AND BUILDING MATERIAL PROVIDED WITH SAME, MICROCAPSULES AND THERMAL STORAGE MATERIAL USING MICROCAPSULES

(71) Applicant: Sharp Kabushiki Kaisha, Osaka-shi, Osaka (JP)

(72) Inventors: Tetsuya Ide, Osaka (JP); Yuka Utsumi, Osaka (JP); Yasuyuki Umenaka, Osaka (JP); Tomohisa Miyatani, Osaka (JP); Takashi Yamashita, Osaka (JP); Akio Miyata, Osaka (JP); Kazuhiro Deguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 14/402,781

(22) PCT Filed: May 17, 2013

(86) PCT No.: PCT/JP2013/063772
§ 371 (c)(1),
(2) Date: Nov. 21, 2014

(87) PCT Pub. No.: WO2013/176050
PCT Pub. Date: Nov. 28, 2013

(65) Prior Publication Data
US 2015/0114592 A1  Apr. 30, 2015

(30) Foreign Application Priority Data

May 23, 2012 (JP) ................................. 2012-118004
Aug. 10, 2012 (JP) ................................. 2012-178111

(51) Int. Cl.
*F28D 17/00* (2006.01)
*F28D 19/00* (2006.01)
(Continued)

(52) U.S. Cl.
CPC ............. *F28D 20/023* (2013.01); *C09K 5/063* (2013.01); *Y02E 60/145* (2013.01); *Y02E 70/30* (2013.01)

(58) Field of Classification Search
CPC ...... F28D 20/023; C09K 5/063; Y02E 60/145; Y02E 70/30
See application file for complete search history.

(56) References Cited

U.S. PATENT DOCUMENTS 5,885,475 A * 3/1999 Salyer .................... C09K 5/063
165/10
8,587,945 B1 * 11/2013 Hartmann .......... H05K 7/20454
361/679.53
(Continued)

FOREIGN PATENT DOCUMENTS

JP  63-006328 A  1/1988
JP  09-174741 A  7/1997
(Continued)

OTHER PUBLICATIONS

Advanced Softmaterials Inc., "Principles and features of Slide-Ring Material", [online], [retrieved on Jun. 7, 2016], [retrieved from the Internet <URL: http://www.asmi.jp/en/tech>.*
(Continued)

*Primary Examiner* — Ljiljana Ciric
(74) *Attorney, Agent, or Firm* — Keating & Bennett, LLP

(57) ABSTRACT

The present invention is to provide a latent heat storage member which is able to more reliably contribute to a daily peak shift of energy consumption, and a building material provided with the latent heat storage member. A latent heat storage member 20 which is formed by using a material including a latent heat storage material such as paraffin and a gelation agent and is used as a building material, includes an outer side surface 20b arranged on a solar light irradiation side facing the outside, and has a phase change temperature T1 within a temperature range between a lowest temperature Tsmin and a highest temperature Tsmax of the outer side surface 20b in the daytime.

10 Claims, 26 Drawing Sheets

(51) Int. Cl.
*F28D 20/02* (2006.01)
*C09K 5/06* (2006.01)

(56) References Cited

U.S. PATENT DOCUMENTS

| | | | | |
|---|---|---|---|---|
| 2009/0035557 | A1* | 2/2009 | Hartmann | D02G 3/404 428/331 |
| 2009/0199994 | A1* | 8/2009 | Amano | C09K 5/063 165/10 |
| 2009/0256107 | A1* | 10/2009 | Hentze | B01J 13/14 252/73 |
| 2009/0289216 | A1* | 11/2009 | Jung | B01J 13/14 252/79 |
| 2010/0015430 | A1* | 1/2010 | Hartmann | B32B 7/02 428/323 |
| 2010/0015869 | A1* | 1/2010 | Hartmann | D01F 1/10 442/59 |
| 2010/0022697 | A1* | 1/2010 | Rodriguez Romero | B01J 13/14 524/461 |
| 2010/0068525 | A1* | 3/2010 | Jung | B01J 13/185 428/407 |
| 2010/0264353 | A1* | 10/2010 | Hartmann | C08B 15/02 252/62 |
| 2010/0327216 | A1* | 12/2010 | Jung | C09B 67/0013 252/70 |
| 2011/0015072 | A1* | 1/2011 | Hechavarria Fonseca | B01J 13/16 504/227 |
| 2012/0076843 | A1* | 3/2012 | Jung | A61K 8/11 424/401 |
| 2012/0095605 | A1* | 4/2012 | Tran | B05D 5/00 700/285 |
| 2012/0096716 | A1* | 4/2012 | Tran | F28D 20/023 29/897.3 |
| 2012/0225290 | A1* | 9/2012 | Hartmann | C08F 20/32 428/364 |
| 2015/0017422 | A1* | 1/2015 | Lee | C04B 20/1018 428/323 |
| 2015/0203733 | A1* | 7/2015 | Zhang | C08F 120/28 522/39 |

FOREIGN PATENT DOCUMENTS

| | | |
|---|---|---|
| JP | 2000-314187 A | 11/2000 |
| JP | 2002-069438 A | 3/2002 |
| JP | 2007-284517 A | 11/2007 |
| JP | 2008-297503 A | 12/2008 |
| JP | 2010-249506 A | 11/2010 |

OTHER PUBLICATIONS

Official Communication issued in International Patent Application No. PCT/JP2013/063772, mailed on Aug. 13, 2013.

Basf De, "Micronal PCM Smadboard," May 2006, 4 pages.

* cited by examiner

FIG. 9
(a)
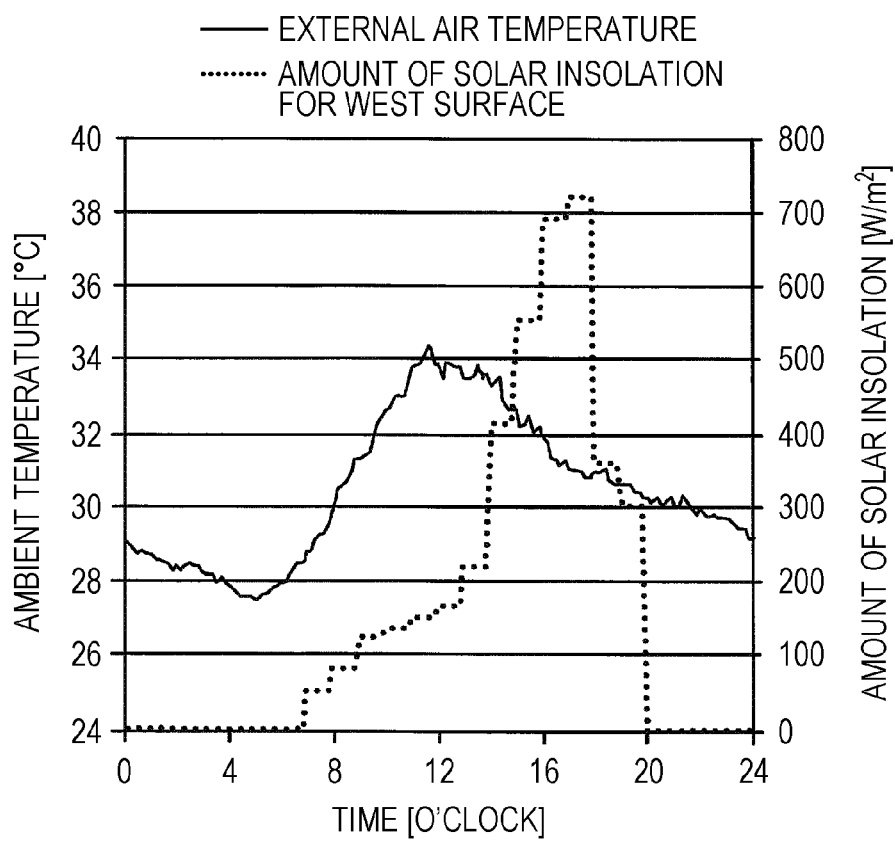
(b) CALCULATION MODEL
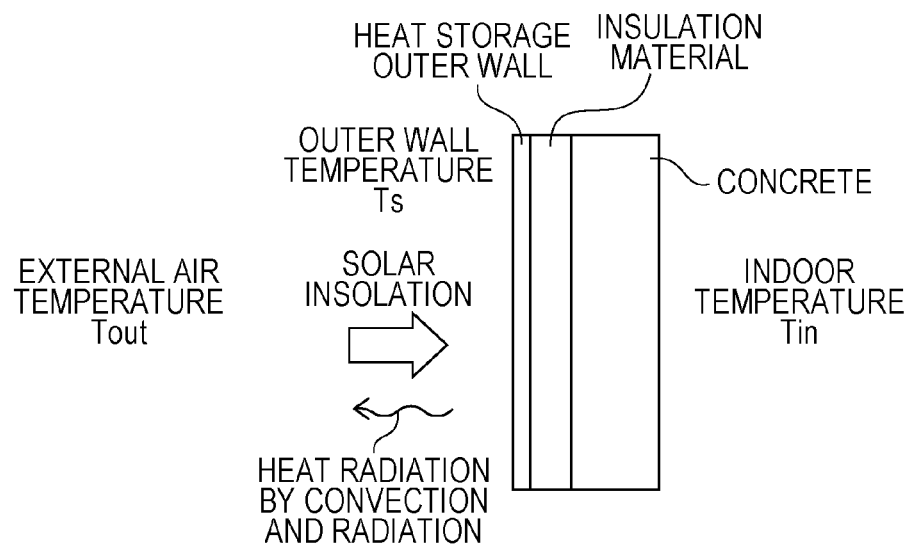

FIG. 15
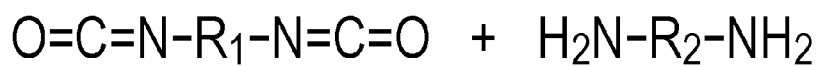
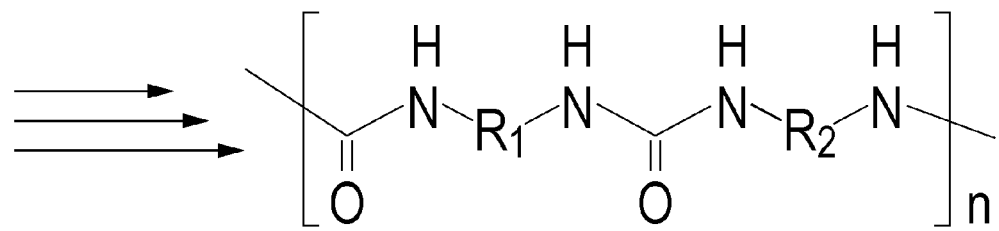
FIG. 16
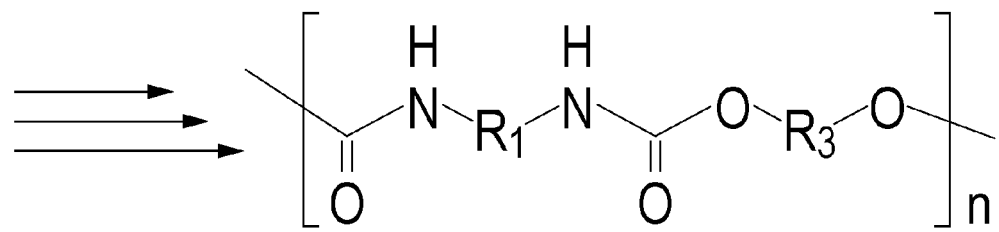

LATENT HEAT STORAGE MEMBER AND BUILDING MATERIAL PROVIDED WITH SAME, MICROCAPSULES AND THERMAL STORAGE MATERIAL USING MICROCAPSULES

TECHNICAL FIELD

The present invention relates to a latent heat storage member and a building material provided with the latent heat storage member.

In addition, the present invention relates to microcapsules and a thermal storage material using the microcapsules.

BACKGROUND ART

In the related art, a heat storage board which is used as a wall material for a house or the like is known (for example, NPL 1). The heat storage board includes a plate-like heat insulation member, and a plurality of microcapsules which is contained in the heat insulation member, and is sealed with a latent heat storage material. A phase change temperature of the latent heat storage material is approximately 23° C. or 26° C.

CITATION LIST

Non Patent Literature

PTL 1: Japanese Unexamined Patent Application Publication No. 2002-69438
PTL 2: Japanese Unexamined Patent Application Publication No. 2007-284517
NPL 1: "MICRONAL PCM SMARTBOARD" Catalog, BASF SE, 2006

SUMMARY OF INVENTION

Technical Problem

The heat storage board described above is for indoor use, and in the daytime of the summer during which an indoor temperature is relatively high, indoor heat is absorbed into the latent heat storage material, and thus the indoor temperature is inhibited from being high. In contrast, in the nighttime of the summer during which the indoor temperature is relatively low, the heat storage board described above radiates the absorbed heat to the outside from the latent heat storage material, and thus returns to a state where the heat absorption is able to be performed. Accordingly, in the daytime of the summer during which energy consumption relatively increases, an indoor cooling load decreases, and thus a daily peak shift of the energy consumption may be able to be realized.

However, depending on the climate of a region in which the heat storage board described above is used or a daily ambient temperature change, it may be difficult to radiate the heat to the outside from the latent heat storage material in the nighttime. For example, in a case of a sultry night (an external air temperature is higher than or equal to 25° C.), a sufficient temperature difference between the indoor temperature and the external air temperature is not obtained (a temperature difference of approximately 2° C. is required), or a time period during which the indoor temperature is less than or equal to the phase change temperature of the latent heat storage material is shortened, and thus it is not possible to sufficiently radiate the heat to the outside from the latent heat storage material. When a heat radiation amount of the latent heat storage material in the nighttime decreases, the heat absorption amount of the latent heat storage material in the daytime of the next day decreases, and thus it is not possible to sufficiently reduce the indoor cooling load in the daytime. Therefore, the heat storage board of the related art has a problem that it is difficult to reliably contribute to the daily peak shift of the energy consumption.

In addition, in the related art, a thermal storage material in which microcapsules including a thermal storage substance are dispersed in an aqueous solution is known. A gelation agent is not added to the thermal storage material including the microcapsules, and the microcapsules are in a powder form, and thus the thermal storage material is easily used. In addition, the thermal storage material using the microcapsules is able to have an increased exterior surface area, and thus has high heat exchanger effectiveness.

The microcapsules including the thermal storage substance, for example, are described in PTL 1 and PTL 2. In microcapsules for heat storage described in PTL 1, a thermoplastic resin is used for a wall substance. In the thermal storage material microcapsules described in PTL 2, a polyurethane or a polyurea is used for a wall substance. Thus, the wall substance of the microcapsules of the related art is formed of a thermoplastic resin (for example, a melamine resin) or a polyurethane resin.

The thermal storage substance exhibits a change in volume when a phase change occurs between a solid phase and a liquid phase. A wall substance formed of a melamine resin or a polyurethane resin may be degraded or damaged due to a volume change caused by the phase change in the thermal storage substance. As a result, durability of the microcapsules is degraded. When the thermal storage material is used with repeated increase or decrease in temperature, cracks occur in the wall substance of the microcapsule, and thus the thermal storage substance leaks into an aqueous solution. In the thermal storage material of the related art, when the thermal storage substance leaks into the aqueous solution, the thermal storage substance which is insoluble in water and the aqueous solution separate from each other, and thus the microcapsules including the thermal storage substance are not able to be dispersed in the aqueous solution, and a desired performance is not obtained.

An object of the present invention is to provide a latent heat storage member which is able to more reliably contribute to a daily peak shift of energy consumption, and a building material provided with the latent heat storage member.

In addition, an object of the present invention is to provide microcapsules having excellent durability, and a thermal storage material using the microcapsules.

Solution to Problem

The object described above is achieved by a latent heat storage member including a surface receiving radiation heat directly or through a protective layer from a heat source such as the sun; and having a phase change temperature T1 within a temperature range between a lowest temperature Tsmin and a highest temperature Tsmax of the surface receiving the radiation heat in the daytime.

In the latent heat storage member of the present invention described above, the lowest temperature Tsmin is approximately identical to an external air temperature Tout of the outside in the daytime.

In the latent heat storage member of the present invention described above, the phase change temperature T1, the lowest temperature Tsmin, and the highest temperature Tsmax satisfy a relationship of Tsmin<T1≤(Tsmin+Tsmax)/2.

In the latent heat storage member of the present invention described above, the phase change temperature T1 is higher than or equal to 27° C.

In the latent heat storage member of the present invention described above, the latent heat storage member is formed by using a material containing paraffin. In addition, in the latent heat storage member of the present invention described above, the latent heat storage member is formed by using a material containing a hydrate.

In the latent heat storage member of the present invention described above, the latent heat storage member is formed by using a material containing a gelation agent.

In addition, the object described above is achieved by a building material including the latent heat storage member of the present invention.

In the building material of the present invention described above, a heat insulation member disposed on an inner side of the latent heat storage member is further included.

In the building material of the present invention described above, another latent heat storage member disposed on the inner side of the heat insulation member is further included.

In the building material of the present invention described above, the other latent heat storage member has a phase change temperature T2 lower than the phase change temperature T1.

In addition, the object described above is achieved by a building including the building material of the present invention.

In addition, the object described above is achieved by a building using the building material of the present invention in a wall generally facing west.

In addition, the object described above is achieved by microcapsules including a thermal storage substance which is subjected to a phase change at a predetermined phase change temperature; a wall substance including the thermal storage substance; and a slide-ring molecule introduced into the wall substance.

In the microcapsules of the present invention described above, the slide-ring molecule includes a linear molecule, cyclic molecules performing clathration with respect to the linear molecule, and blocking groups arranged on both terminals of the linear molecule.

In the microcapsules of the present invention described above, the slide-ring molecule is a polyrotaxane.

In the microcapsules of the present invention described above, the wall substance is configured of a polyurea or a polyurethane.

In the microcapsules of the present invention described above, the linear molecule is a polyethylene glycol or a polycaprolactone.

In the microcapsules of the present invention described above, the cyclic molecule is at least one cyclodextrin selected from α-cyclodextrin, β-cyclodextrin, and γ-cyclodextrin.

In the microcapsules of the present invention described above, the cyclic molecule is connected to a polymer chain configuring the wall substance by a urea bond or a urethane bond.

In the microcapsules of the present invention described above, the cyclic molecule includes a hydroxyl group or an amine group.

In the microcapsules of the present invention described above, as the thermal storage substance, an organic material or an inorganic material is used.

In addition, the object described above is achieved by a thermal storage material including a container; an aqueous inorganic salt solution filled into the container; and the microcapsules according to the invention dispersed in the aqueous inorganic salt solution.

Advantageous Effects of Invention

According to the present invention, it is possible to realize a latent heat storage member which is able to more reliably contribute to the daily peak shift of the energy consumption, and a building material provided with the latent heat storage member.

In addition, according to the present invention, it is possible to provide microcapsules having excellent durability, and a thermal storage material using the microcapsules.

BRIEF DESCRIPTION OF DRAWINGS

FIG. 9 is a diagram describing optimal conditions for a phase change temperature T1 according to the first embodiment of the present invention.

FIG. 15 is a reaction formula of a polyurea reaction in which a polyurea is created.

FIG. 16 is a reaction formula of a polyurethane reaction in which a polyurethane is created.

DESCRIPTION OF EMBODIMENTS

[First Embodiment]

Figure 1:
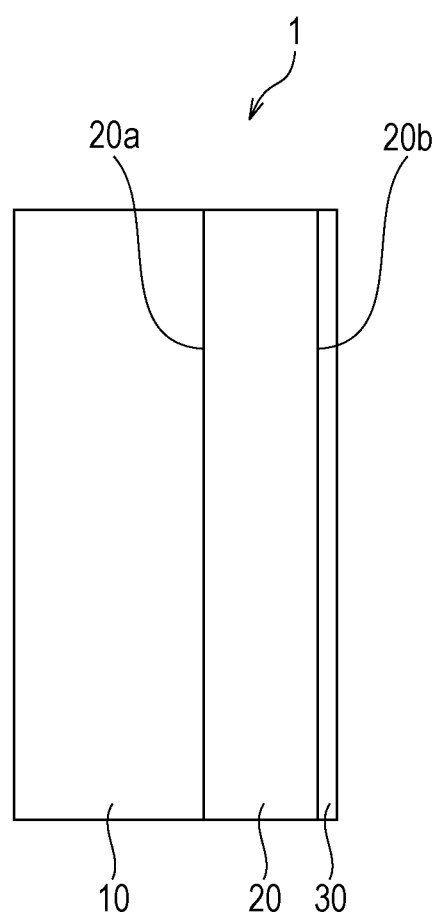
FIG. 1 is a diagram illustrating a schematic cross sectional configuration of a latent heat storage member 20 and a wall material 1 provided with the latent heat storage member 20 according to a first embodiment of the present invention.

A latent heat storage member and a building material provided with the latent heat storage member according to a first embodiment of the present invention will be described by using FIG. 1 to FIG. 8. Furthermore, in all of the following drawings, in order to facilitate understanding, each constituent is illustrated with dimensions and the scale thereof being suitably changed. FIG. 1 illustrates a schematic cross sectional configuration of a latent heat storage member 20 and a wall material 1 (an example of a building material) provided with the latent heat storage member 20 according to this embodiment. In FIG. 1, a left side indicates an indoor side, and a right side indicates an outdoor side (outside). In addition, the wall material 1 illustrated in FIG. 1 is used in an outer wall facing a direction from which solar light is able to be emitted (for example, an easterly direction, a southeasterly direction, a southerly direction, a southwesterly direction, a westerly direction, or the like in the northern hemisphere) in a building such as a house. In particular, when a wall having fewer windows is used, a heat input from the wall increases, and thus this is effective.

As illustrated in FIG. 1, the wall material 1 has a configuration in which the latent heat storage member 20, and a heat insulation member 10 arranged on an indoor side (an inner side) of the latent heat storage member 20 are laminated. Each of the heat insulation member 10 and the latent heat storage member 20 is in the shape of a flat plate. On an outdoor side (an outer side) of the latent heat storage member 20, an outer wall material (a siding) 30 is arranged. Here, in order to simplify the description, a temperature of an outer side surface of the outer wall material 30 in the configuration illustrated in FIG. 1 is set to be approximately equal to a temperature of an outer side surface 20b of the latent heat storage member 20. That is, the outer wall material 30 has a relatively small heat capacity, a relatively high thermal conductivity, and a relatively thin thickness. In addition, the outer wall material 30 is omittable.

The heat insulation member 10 is formed by using a material having a relatively low thermal conductivity. As the heat insulation member 10, a fiber heat insulation material (for example, glass wool), a foamed resin heat insulation material (for example, polyurethane foam), and the like are used.

The latent heat storage member 20 has a configuration in which a latent heat storage material formed by using a predetermined material is sealed with a predetermined film. As inner side surface 20a of the latent heat storage member 20 is in contact with or adjacent to an outer side surface of the heat insulation member 10. The outer side surface (a surface receiving radiation heat from a heat source such as the sun) 20b of the latent heat storage member 20 is in contact with or adjacent to the inner side surface of the outer wall material 30. The latent heat storage member 20 (a latent heat storage material) has a predetermined phase change temperature (a melting point) T1 at which a phase change between a solid phase and a liquid phase occurs reversibly. The latent heat storage member 20 is in the liquid phase at a high temperature which is higher than the phase change temperature T1, and in the solid phase at a low temperature which is lower than the phase change temperature T1. The latent heat storage member 20 maintains a constant phase change temperature insofar as two phases of the solid phase and the liquid phase are mixed at the time of the phase change, and thus it is possible to maintain a constant temperature for a relatively long time. The phase change temperature T1 of the latent heat storage member 20 is able to be measured by a differential scanning calorimeter (DSC).

In this embodiment, the phase change temperature T1 of the latent heat storage member 20 is in a temperature range between a lowest temperature Tsmin and a highest temperature Tsmax of the outer side surface 20b in the daytime of the summer (Tsmin<T1≤Tsmax). In addition, it is preferable that the phase change temperature T1 be a temperature closer to the lowest temperature Tsmin than the highest temperature Tsmax. That is, it is preferable that the phase change temperature T1 be lower than or equal to an average temperature of the lowest temperature Tsmin and the highest temperature Tsmax (T1≤(Tsmin+Tsmax)/2). The lowest temperature Tsmin is a temperature (for example, 25° C.) which is approximately identical to a lowest external air temperature Tout of the external air temperature Tout in a day (for example, in the daytime) of the summer. In addition, the highest temperature Tsmax is a temperature when the temperature of the outer side surface 20b has increased due to the radiation heat of solar light. When the lowest temperature Tsmin is set to 25° C., and the highest temperature Tsmax is set to 70° C., the phase change temperature T1 of the latent heat storage member 20 is in a temperature range (Tsmin<T1≤Tsmax) which is higher than 25° C. and lower than or equal to 70° C. In addition, it is preferable that the phase change temperature T1 of the latent heat storage member 20 be in a temperature range (Tsmin<T1≤(Tsmin+Tsmax)/2) of 27° C. to 48.5° C. in order to obtain a temperature difference. By setting the phase change temperature T1 to be in this range, it is possible to reduce a temperature difference between an indoor temperature and an outdoor (outside) temperature. The heat input amount is in proportion to the temperature difference, and thus it is possible to reduce the heat input amount with respect to the indoor side, an increase in the indoor temperature is suppressed, and it is possible to reduce a cooling load.

The latent heat storage member 20, for example, is formed by using a material including paraffin. Paraffin is a general term for saturated chain type hydrocarbons denoted by a general formula $C_nH_{2n+2}$. When single paraffins are used, the phase change temperature of the latent heat storage member 20 changes according to the number of carbon chains n of the paraffin. The phase change temperature of paraffin increases as the number of carbon chains n increases. When a mixture of two or more types of paraffin is used, it is possible to adjust the phase change temperature of the latent heat storage member 20 by changing a mixing ratio. For example, as paraffin of which a phase change temperature is in a temperature range of 27° C. to 48.5° C., n-docosane ($C_{22}H_{46}$) (a melting point of 44.0° C., and a melting heat of 157 kJ/kg), n-eicosane ($C_{20}H_{42}$) (a melting point of 36.4° C., and a melting heat of 247 kJ/kg), n-octadecane ($C_{18}H_{38}$) (a melting point of 28.2° C., and a melting heat of 243 kJ/kg), and the like are included.

In addition, when the phase change temperature is in the temperature range described above, various organic materials other than paraffin and various inorganic materials are able to be used in the latent heat storage member 20. For example, as an organic material of which the phase change temperature is in the temperature range of 27° C. to 48.5° C. other than paraffin, lauric acid (a melting point of 44° C., and a melting heat of 178 kJ/kg), capric acid (a melting point of 31.5° C., and a melting heat of 153 kJ/kg), and the like are included. In addition, as an inorganic material of which the phase change temperature is in the temperature range of 27° C. to 48.5° C., $Na_2S_2O_3 \cdot 5H_2O$ (a melting point of 48.5° C., and a melting heat of 197 kJ/kg), $CaBr_2 \cdot 6H_2O$ (a melting point of 38.2° C., and a melting heat of 115 kJ/kg), $Zn(NO_3)_2 \cdot 6H_2O$ (a melting point of 36° C., and a melting heat of 147 kJ/kg), $Na_2HPO_4 \cdot 12H_2O$ (a melting point of 35.2° C., and a melting heat of 281 kJ/kg), $Na_2SO_4 \cdot 10H_2O$ (a melting point of 32.4° C., and a melting heat of 251 kJ/kg), $LiNO_3 \cdot 3H_2O$ (a melting point of 30° C., and a melting heat of 255 kJ/kg), $Ca(NO_3)_2 \cdot 4H_2O/Mg(NO_3)_2 \cdot 6H_2O$ (a melting point of 30° C., and a melting heat of 136 kJ/kg), $CaCl_2 \cdot 6H_2O$ (a melting point of 29.8° C., and a melting heat of 192 kJ/kg), and the like are included. In addition, the formation heat of clathrate hydrates may be used instead of a phase change between solid and liquid. Specifically, $(C_4H_9)_4NF$ (a melting point of 30° C., and a melting heat of 165 kJ/kg) which is an alkyl quaternary ammonium salt, $(iso-C_5H_{11})_4NF$ (a melting point of 31.5° C., and a melting heat of 237 kJ/kg), $(iso-C_5H_{11})_4NCl$ (a melting point of 29.6° C., and a melting heat of 263 kJ/kg), and the like are included. Such a latent heat storage material is able to store a large heat quantity in the vicinity of a melting point (a phase change temperature). In sensible heat storage using specific heat of a substance, it is not possible to perform heat storage of this amount in the same quantity. For example, in a case of concrete, only heat of approximately 4.5 kJ/kg is able to be stored at a temperature difference of 5° C.

In addition, the latent heat storage member 20 of this embodiment (the latent heat storage material) is in the form of a gel. That is, the latent heat storage member 20 of this embodiment, for example, is formed by using a material including a gelation agent which gelates (solidifies) paraffin. The gel is formed by crosslinking molecules to form a three-dimensional network structure, by absorbing a solvent inside the structure, and by expanding the structure. The gelation agent has a gelation effect only when several % by weight is contained in paraffin. The gel-like latent heat storage member 20 wholly maintains a solid state even when the phase change between the solid phase and the liquid phase occurs, and does not have liquidity even in a liquid phase state. Therefore, in any of the solid phase and the liquid phase, the latent heat storage member 20 itself maintains a stable shape, and thus it is possible to easily handle the latent heat storage member 20. In the gelated latent heat storage member 20, the gelation agent, for example, is a polymer having a molecular weight (for example, a molecular weight greater than or equal to 10000) which is at least greater than a molecular weight of the paraffin.

A flame retardant, a supercooling prevention agent, and the like, may be added to the latent heat storage member 20 including the organic material or the inorganic material described above, as necessary.

The latent heat storage member 20 of this embodiment has a configuration in which the latent heat storage material is sealed with a film having a high gas barrier property. Accordingly, even when the latent heat storage material is volatile, it is possible to prevent aging degradation or the like. This film, for example, is formed by using a material having a relatively high thermal conductivity such as aluminum deposited polyethylene terephthalate. It is preferable that the film be able to contract according to volume contraction of the latent heat storage material in order to prevent deformation of the latent heat storage member 20 due to repeated phase changes.

Figure 2:
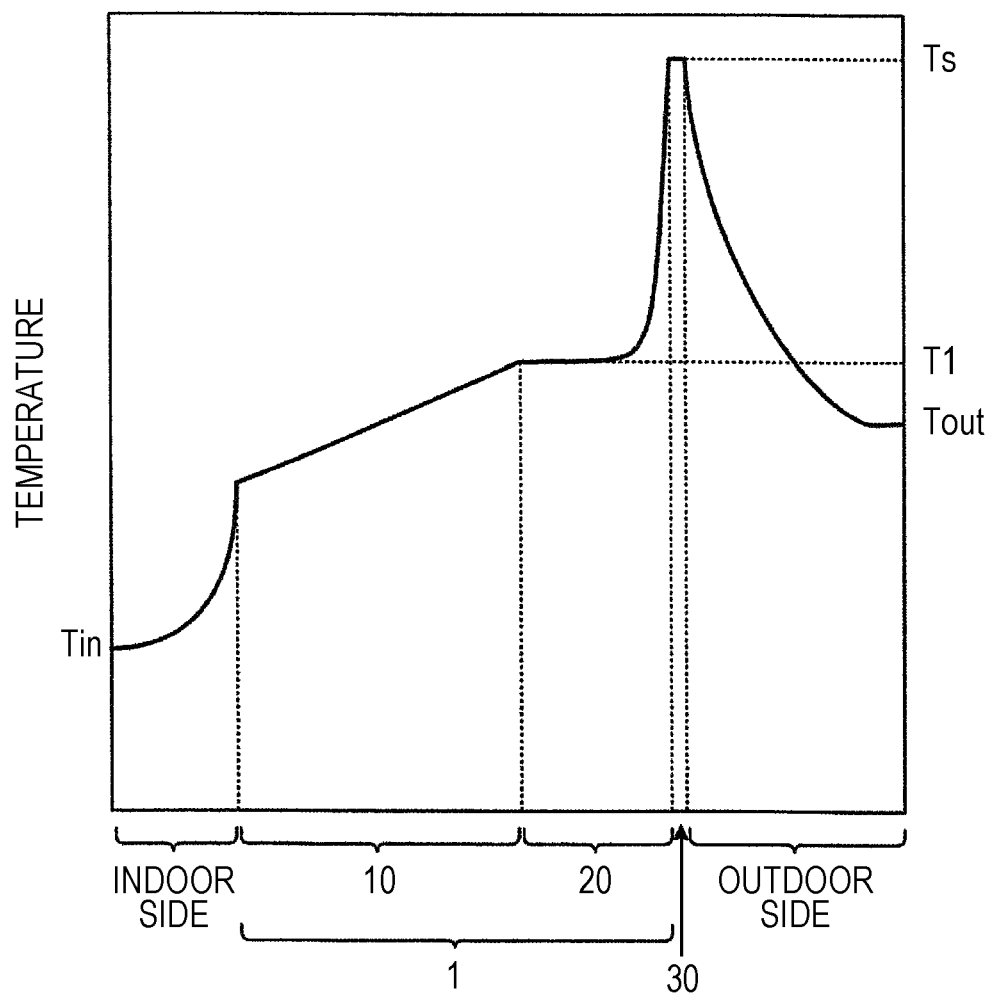
FIG. 2 is a diagram illustrating an example of a temperature gradient of the wall material 1 according to the first embodiment of the present invention at a timepoint in the daytime of the summer.

FIG. 2 illustrates an example of a temperature gradient of the wall material 1 or the like at a timepoint in the daytime of the summer. In FIG. 2, a left side indicates an indoor side, and a right side indicates an outdoor side. A vertical direction indicates temperature. When the weather in the daytime of the summer is sunny, an exterior surface temperature Ts (for example, identical to the highest temperature Tsmax) of the outer wall material 30 or the outer side surface 20b of the latent heat storage member 20 is higher than an external air temperature Tout (for example, identical to the lowest temperature Tsmin) due to solar radiation (the solar insolation). When the phase change temperature T1 of the latent heat storage member 20 is in a temperature range between the external air temperature Tout and the exterior surface temperature Ts, heat transferred to the inside of the latent heat storage member 20 is absorbed as melting heat at the time of the phase change in the latent heat storage member 20 from the solid phase to the liquid phase even when the temperature Ts of the outer side surface 20b of the latent heat storage member 20 increases. Therefore, it is possible to prevent a heat input from the outdoor side to the indoor side, and it is possible to suppress an increase in the indoor temperature.

In addition, the temperature of the latent heat storage member 20 is maintained at the phase change temperature T1 in a state where a solid-liquid phase and the liquid phase are mixed. For this reason, when the phase change temperature T1 is a relatively low temperature in the temperature range between the lowest temperature Tsmin and the highest temperature Tsmax, it is possible to decrease a temperature gradient (a temperature gradient of the heat insulation member 10) between the latent heat storage member 20 (the phase change temperature T1) and the indoor side (an indoor temperature Tin). Therefore, it is possible to prevent the heat input from the outdoor side to the indoor side, and it is possible to suppress the increase in the indoor temperature.

When the weather changes to being cloudy from being sunny after the state illustrated in FIG. 2, heat is hardly transferred to the outer wall material 30 or the outer side surface 20b of the latent heat storage member 20 due to solar insolation, and thus the exterior surface temperature Ts decreases to approximately the external air temperature Tout which is lower than the phase change temperature T1 of the latent heat storage member 20. Therefore, the heat accumulated in the latent heat storage member 20 as the melting heat is released to the outdoor side as heat of solidification at the time of the phase change in the latent heat storage member 20 from the liquid phase to the solid phase. Accordingly, the latent heat storage member 20 returns to the state where the heat absorption is able to be performed again. Even when the weather is sunny all day long before sunset, heat is not reliably transferred to the outer wall material 30 or the outer side surface 20b of the latent heat storage member 20 by solar insolation in the nighttime after sunset, and thus the latent heat storage member 20 returns to the state where the heat absorption is able to be performed. Here, in order to improve a heat radiation property from the latent heat storage member 20 to the outdoor side, it is preferable that the outer side surface of the outer wall material 30 be a radiational cooling surface having high emissivity of infrared light.

Figure 3:
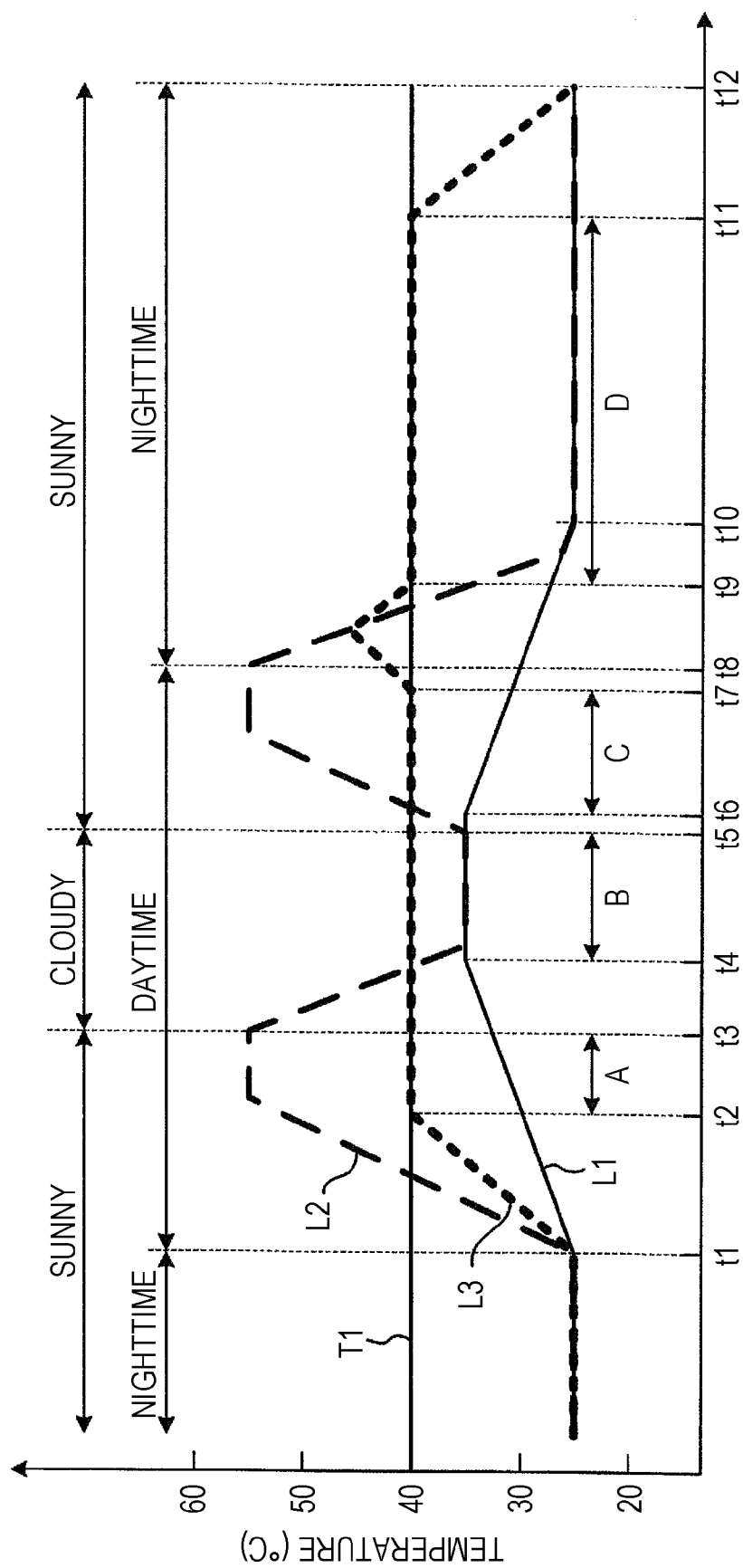
FIG. 3 is a graph illustrating an example of temperature change in a day of the summer when the latent heat storage member 20 according to the first embodiment of the present invention is used.

FIG. 3 is a graph illustrating an example of temperature change in a day (from sunrise to sunrise of the next day) of the summer when the latent heat storage member 20 according to this embodiment is used. In FIG. 3, a horizontal axis indicates elapsed time, and a vertical axis indicates temperature (° C.). A solid line curve L1 indicates a change in the external air temperature over time, a long broken line curve L2 indicates a change in the exterior surface temperature (the temperature of the outer side surface 20b) of the latent heat storage member 20 over time, and a short broken line curve L3 indicates a change in an inside temperature (for example, a temperature of a center of the latent heat storage member 20 in a thickness direction) of the latent heat storage member 20 over time. The phase change temperature T1 of the latent heat storage member 20 (the latent heat storage material) is set as being 40° C. The external air temperature is 25° C. at a sunrise time t1, monotonously increases from 25° C. to 35° C. during a period from the time t1 to a time t4, is maintained at 35° C. during a period from the time t4 to a time t6, monotonously decreases from 35° C. to 25° C. during a period from the time t6 to time t10, and is maintained at 25° C. during a period from the time t10 to a sunrise time t1 of the next day. That is, a lowest temperature of the external air temperature in a day of this example is 25° C., and a highest temperature is 35° C. A sunset time is set to a time t8 between the time t6 and the time t10. In a day of this example, a period from the sunrise time t1 to the sunset time t8 is daytime, and a period from the sunset time t8 to the sunrise time t1 of the next day is nighttime. In addition, the weather from the sunrise time t1 to a time t3 is set as being sunny, the weather from the time t3 to a time t5 is set as being cloudy, the weather from the time t5 to the sunset time t8 is set as being sunny, and the weather of the nighttime after the time t8 is set as being sunny.

First, temperature change in the latent heat storage member 20 during the period (from the sunrise time t1 to the time t3) in which the weather is sunny will be described. At the sunrise time t1, the exterior surface temperature and the inside temperature of the latent heat storage member 20 are identical to the external air temperature of 25° C., and the latent heat storage member 20 is in the solid phase. After the time t1, the exterior surface temperature of the latent heat storage member 20 increases according to an increase in the external air temperature, and also increases due to solar insolation. In this example, after the time t1, the exterior surface temperature of the latent heat storage member 20 increases to approximately 55° C. at a rate of increase which is faster than that of the external air temperature. The inside temperature of the latent heat storage member 20 increases due to heat conduction from the outer side surface 20b of the latent heat storage member 20. In this example, after the time t1, the inside temperature of the latent heat storage member 20 increases at a rate of increase which is faster than that of the external air temperature and slower than that of the exterior surface temperature, and reaches the phase change temperature T1 at the time t2. The inside temperature of the latent heat storage member 20 after the time t2 is maintained at the phase change temperature T1 until the phase change from the solid phase to the liquid phase is completed.

Next, temperature change in the latent heat storage member 20 during the period after the weather becomes cloudy and then changes to being sunny again (from the time t5 to the sunset time t8) will be described. When the weather changes to being sunny from being cloudy at the time t5, the exterior surface temperature of the latent heat storage member 20 increases due to solar insolation. In this example, after the time t5, the exterior surface temperature of the latent heat storage member 20 increases to approximately 55° C. at a predetermined rate of increase. The inside temperature of the latent heat storage member 20 is maintained at the phase change temperature T1 until the time t7 at which the phase change from the solid phase to the liquid phase is completed, and increases after the time t7.

Next, temperature change in the latent heat storage member 20 in the nighttime (after the sunset time t8) will be described. In the nighttime, heat is not transferred due to solar insolation, and thus the exterior surface temperature of the latent heat storage member 20 gradually decreases to approximately the external air temperature due to heat exchange with the ambient air. In this example, the exterior surface temperature of the latent heat storage member 20 at the time t8 is higher than the inside temperature, and thus the inside temperature of the latent heat storage member 20 increases due to heat conduction from the outer side surface 20b during a predetermined time period after the time t8. After that, the inside temperature of the latent heat storage member 20 decreases according to a decrease in the exterior surface temperature of the latent heat storage member 20, and reaches the phase change temperature T1 at a time t9. The inside temperature of the latent heat storage member 20 is maintained at the phase change temperature T1 until a time t11 at which the phase change from the liquid phase to the solid phase is completed, decreases again after the time t11, and becomes close to an exterior surface temperature (the external air temperature) of the latent heat storage member 20.

When such temperature change occurs in a day, the lowest temperature Tsmin of the exterior surface temperature of the latent heat storage member 20 is 25° C. in the daytime, and the highest temperature Tsmax is 55° C. At the time t1 when the exterior surface temperature of the latent heat storage member 20 is the lowest temperature Tsmin, the exterior surface temperature is identical to the external air temperature.

As described above, first, in a part of the latent heat storage member 20, the phase change from the solid phase to the liquid phase occurs during a period A (the time t2 to t3). Accordingly, the latent heat storage member 20 absorbs the heat from the outdoor side in the period A, and thus it is possible to suppress the increase in the indoor temperature. After that, in a part of the latent heat storage member 20, the phase change from the liquid phase to the solid phase occurs during a period B (the time t4 to t5) during which the weather changes to being cloudy. Accordingly, a part of the latent heat storage member 20 radiates the absorbed heat to the outdoor side, and thus is able to return to the state where the heat absorption is able to be performed. After that, in a part of the latent heat storage member 20, the phase change from the solid phase to the liquid phase occurs during a period C (the time t6 to t7) during which the weather changes to being sunny again. Accordingly, the latent heat storage member 20 absorbs the heat from the outdoor side in the period C, and thus it is possible to suppress the increase in the indoor temperature. After that, in a period D (the time t9 to t11) of the nighttime, in the approximately entire latent heat storage member 20, the phase change from the liquid phase to the solid phase occurs. Accordingly, the latent heat storage member 20 radiates the absorbed heat to the outdoor side, and thus is able to return to the state where the heat absorption is able to be performed.

According to the latent heat storage member 20 of this embodiment, when the weather changes to being cloudy from being sunny in the daytime, it is possible to radiate the absorbed heat in a period of being cloudy in the daytime. For this reason, it is possible to substantially increase a heat absorption amount of the latent heat storage member 20 per unit mass in the daytime. Therefore, it is possible to realize thickness reduction and weight reduction of the latent heat storage member 20, and it is possible to suppress heat input to the indoor side for a long time.

In addition, according to the latent heat storage member 20 of this embodiment, even when the weather does not change to being cloudy from being sunny in the daytime, it is possible to reliably radiate the absorbed heat in the nighttime during which there is no solar insolation. For this reason, it is possible to reliably secure a heat absorption amount required for reducing an indoor cooling load of the daytime, and thus it is possible to more reliably contribute to the daily peak shift of the energy consumption.

In addition, in the latent heat storage member 20 of this embodiment, the phase change temperature of the latent heat storage material is set to be between the highest temperature Tsmax and the lowest temperature Tsmin of the exterior surface temperature of the latent heat storage member 20. In general, there is a temperature difference of approximately tens of ° C. between the highest temperature Tsmax and the lowest temperature Tsmin, and thus the phase change temperature of the latent heat storage material is easily set (a substance of the latent heat storage material is easily selected).

Here, a case where the heat storage board of the related art is used instead of the latent heat storage member 20 of this embodiment is considered. The phase change temperature of the latent heat storage material in the heat storage board of the related art is approximately 23° C. or 26° C. In the example illustrated in FIG. 3, the external air temperature decreases only to 25° C. even in the nighttime, and thus when it is considered that the phase change occurs within a temperature width of several degrees Celsius, in the heat storage board of the related art, the absorbed heat is not able to be radiated in the nighttime. In addition, when the external air temperature decreases according to a change in the weather from sunny weather to cloudy weather or the like in the daytime, a temperature change including a phase change temperature range does not occur, and thus sufficient heat radiation is not able to be performed. Therefore, in the heat storage board of the related art, it is difficult for the latent heat storage material to reliably return to the state where the heat absorption is able to be performed in one day period unlike the latent heat storage member 20 of this embodiment.

Even when the external air temperature decreases to be lower than or equal to 25° C. in the nighttime, and heat radiation is able to be performed from the heat storage board in the nighttime, heat radiation is less likely to be performed from the heat storage board according to temperature change in the daytime during which the external air temperature is relatively high. Therefore, in the heat storage board of the related art, it is difficult to substantially increase a heat absorption amount in the daytime unlike the latent heat storage member 20 of this embodiment.

In addition, in the heat storage board of the related art, it is necessary that the phase change temperature of the latent heat storage material be set between the external air temperature in the daytime of the summer and the external air temperature in the nighttime of the summer. Therefore, when the heat storage board of the related art is used in a region where a temperature difference between day and night of the summer is large (for example, Europe), the phase change temperature of the latent heat storage material is relatively easily set (the substance of the latent heat storage material is relatively easily selected), but when the heat storage board of the related art is used in a region where the temperature difference between day and night of the summer is large is small (for example, Japan), it is difficult to set the phase change temperature of the latent heat storage material.

EXAMPLE 1

Figure 4:
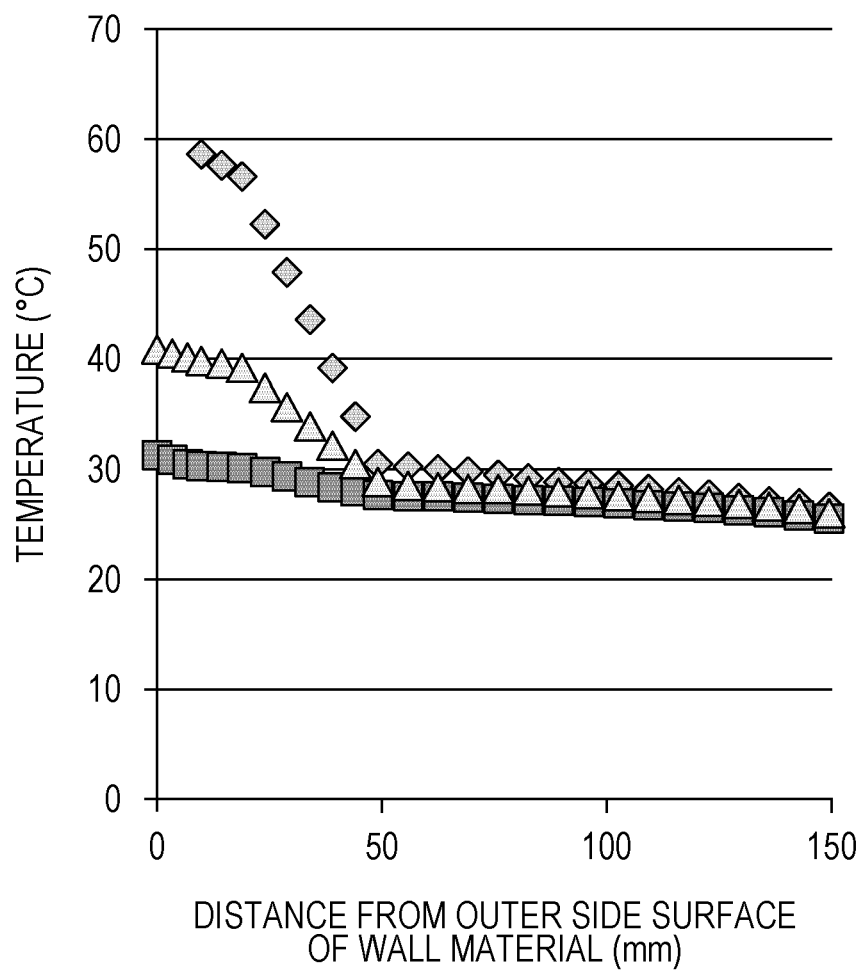
FIG. 4 is a graph illustrating results calculated by performing a non-steady analysis with respect to a temperature distribution in a wall material having an RC structure in a thickness direction at the time of solar insolation.

FIG. 4 is a graph illustrating results calculated by performing a non-steady analysis with respect to a temperature distribution in a wall material having an RC structure in a thickness direction at the time of solar insolation. In the graph, a horizontal axis indicates a distance (mm) from an outer side surface of the wall material in an inside direction, and a vertical axis indicates temperature (° C.). In the graph, a "■" mark indicates a temperature distribution in a wall material a, a "▲" mark indicates a temperature distribution in a wall material b, and a "♦" mark indicates a temperature distribution in a wall material c. Here, the wall materials a, b, and c having the RC structure have a structure in which a siding (a thickness of 9 mm, thermal conductivity of 0.21 W/(m·K), specific heat of 1072 J/(kg·K), and density of 1080 kg/m$^3$), a heat insulation material (a thickness of 30 mm, thermal conductivity of 0.051 W/(m·K), specific heat of 870 J/(kg·K), and density of 16 kg/m$^3$), concrete (a thickness of 100 mm, thermal conductivity of 1.2 W/(m·K), specific heat of 900 J/(kg·K), and density of 2400 kg/m$^3$), and a gypsum board (a thickness of 12 mm, thermal conductivity of 0.22 W/(m·K), specific heat of 1046 J/(kg·K), and density of 592 kg/m$^3$) are laminated in this order from an outer side. In the wall material a, a latent heat storage material A (a phase change temperature of 30° C.) having a thickness of 10 mm is arranged on an outer side of the siding, in the wall material b, a latent heat storage material B (a phase change temperature of 40° C.) having a thickness of 10 mm is arranged on an outer side of the siding, and in the wall material c, a latent heat storage material is not arranged. A density of the latent heat storage materials A and B 790 kg/m$^3$, a specific heat of the latent heat storage material A is 1800 J/(kg·K) (solid), a specific heat of the latent heat storage material B is 114500 J/(kg·K) (solid→liquid), and a specific heat of the latent heat storage material is 2100 J/(kg·K) (liquid), a thermal conductivity of the latent heat storage material A is 0.34 W/(m·K) (solid, solid→liquid), and a thermal conductivity of the latent heat storage material B is 0.14 W/(m·K) (liquid). Solar insolation was performed four times at an irradiation intensity of 50 W/m$^2$ with respect to each outer side surface of the wall materials a, b, and c.

As illustrated in FIG. 4, the amount of solar insolation described above is entirely absorbed by latent heat capacities of the latent heat storage materials A and B, and temperatures of the outer side surfaces of the wall materials a and b are maintained at a phase change temperature (30° C. or 40° C.) of each of the latent heat storage materials. In contrast, a temperature of the outer side surface of the wall material c in which the latent heat storage material is not disposed is approximately 60° C. Accordingly, it can be understood that the latent heat storage material suppresses an increase in the temperature of the outer side surface of the wall materials a and b. In addition, in the wall materials a and b in which the latent heat storage material is disposed, the temperature of an inner side surface is low compared to the wall material c. Accordingly, it can be understood that the latent heat storage material also suppresses the increase in the temperature of the inner side surface of the wall materials a and b.

EXAMPLE 2

Figure 5:
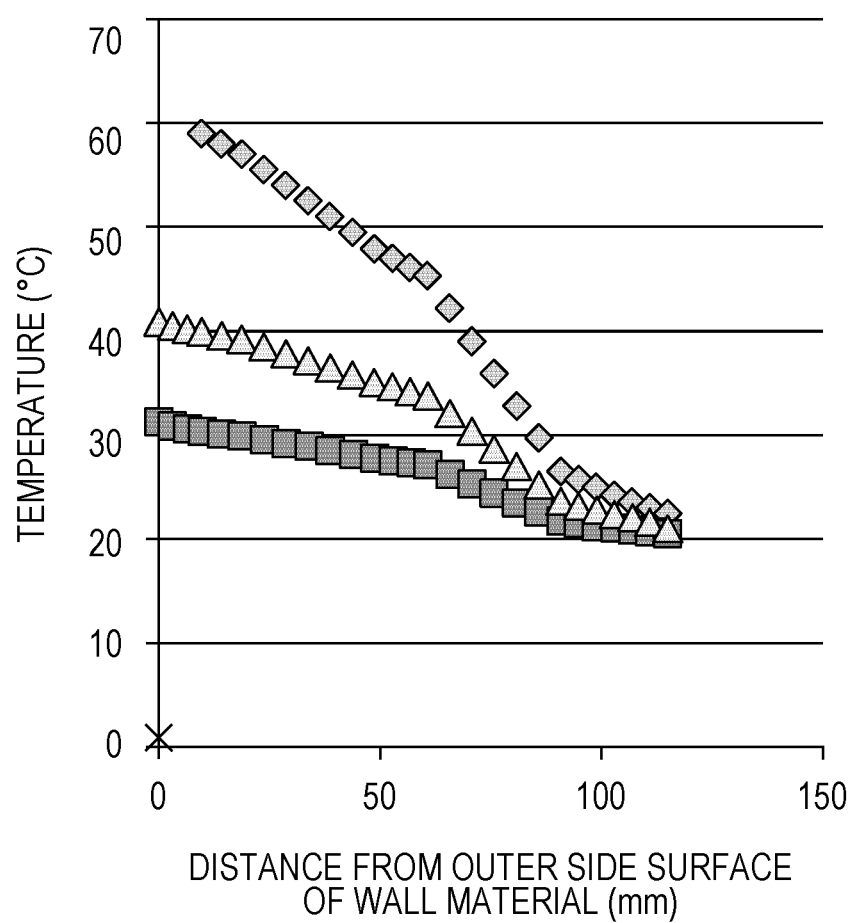
FIG. 5 is a graph illustrating results calculated by performing a non-steady analysis with respect to a temperature distribution in a wall material having a timber structure in the thickness direction at the time of solar insolation.

FIG. 5 is a graph illustrating results calculated by performing a non-steady analysis with respect to a temperature distribution in a wall material having a timber structure in the thickness direction at the time of solar insolation. In the graph, a horizontal axis indicates a distance (mm) from an outer side surface of the wall material in the inside direction, and a vertical axis indicates temperature (° C.). In the graph, a "■" mark indicates a temperature distribution in a wall material d, a "▲" mark indicates a temperature distribution in a wall material e, and a "◆" mark indicates a temperature distribution in a wall material f. Here, the wall materials d, e, and f having the timber structure have a structure in which a siding (a thickness of 9 mm, and a thermal conductivity, specific heat, and density identical to that described above), an air layer (a thickness of 30 mm, thermal conductivity of 0.026 W/(m·K), specific heat of 1007 J/(kg·K), and density of 1.1763 kg/m$^3$), a plyboard (a thickness of 12 mm, thermal conductivity of 0.162 W/(m·K), specific heat of 1619 J/(kg·K), and density of 400 kg/m$^3$), a heat insulation material (a thickness of 30 mm, and a thermal conductivity, specific heat, and density identical to that described above), a plyboard (a thickness of 12 mm, and a thermal conductivity, specific heat, and density identical to that described above), and a gypsum board (a thickness of 12 mm, and a thermal conductivity, specific heat, and density identical to that described above) are laminated in this order from the outer side. In the wall material d, a latent heat storage material A (a phase change temperature of 30° C.) having a thickness of 10 mm is arranged on an outer side of the siding, in the wall material e, a latent heat storage material B (a phase change temperature of 40° C.) having a thickness of 10 mm is arranged on an outer side of the siding, and in the wall material f, a latent heat storage material is not arranged. Solar insolation was performed four times at an irradiation intensity of 50 W/m$^2$ with respect to each outer side surface of the wall materials a, b, and c.

As illustrated in FIG. 5, the amount of solar insolation described above is entirely absorbed by latent heat capacities of the latent heat storage materials A and B, and temperatures of the outer side surfaces of the wall materials d and e are maintained at a phase change temperature (30° C. or 40° C.) of each of the latent heat storage materials. In contrast, a temperature of the outer side surface of the wall material f in which the latent heat storage material is not disposed is approximately 60° C. Accordingly, it can be understood that the latent heat storage material suppresses an increase in the temperature of the outer side surface of the wall materials d and e. In addition, in the wall materials d and e in which the latent heat storage material is disposed, the temperature of an inner side surface is low compared to the wall material f. Accordingly, it can be understood that the latent heat storage material also suppresses the increase in the temperature of the inner side surface of the wall materials d and e.

Figure 6:
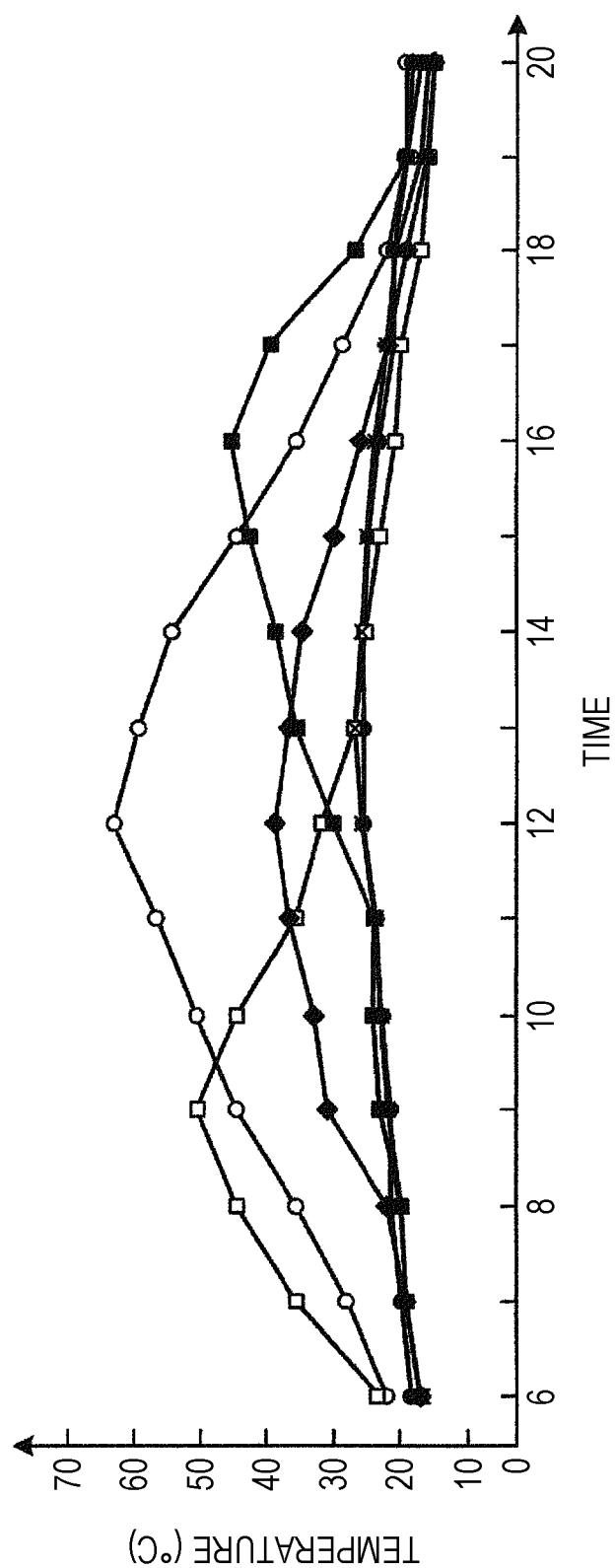
FIG. 6 is a graph illustrating an example of change in an exterior surface temperature of an outer wall and a roof in a certain region in Japan on a sunny day.

Next, a setting procedure (a material selection procedure of the latent heat storage material) of the phase change temperature of the latent heat storage member 20 according to this embodiment will be described. FIG. 6 is a graph illustrating an example of change in an exterior surface temperature of an outer wall and a roof in a certain region in Japan on a sunny day. In the graph, a horizontal axis indicates time (6 o'clock to 20 o'clock), and a vertical axis indicates temperature (° C.). Here, a period from 6 o'clock to 18 o'clock is daytime, and a period from 18 o'clock to 20 o'clock is nighttime. In the graph, a curve connecting "□" marks indicates a change in an exterior surface temperature of an outer wall facing east (an east wall), a curve connecting "▲" marks indicates a change in an exterior surface temperature of an outer wall facing south (a south wall), a curve connecting "■" marks indicates a change in an exterior surface temperature of an outer wall facing west (a west wall), a curve connecting "×" marks indicates a change in an exterior surface temperature of an outer wall facing north (a north wall), a curve connecting "○" marks indicates a change in an exterior surface temperature of an approximately horizontal roof, and a curve connecting "●" marks indicates a change in an external air temperature.

As illustrated in FIG. 6, a highest temperature of an east wall exterior surface in the daytime is approximately 50° C. (at 10 o'clock), and a lowest temperature of the east wall exterior surface in the daytime is approximately 16° C. (at 18 o'clock). Therefore, as the latent heat storage member 20 used in the east wall of a building in this region, a latent heat storage material having a phase change temperature of 18° C. to 50° C. (preferably, 18° C. to 33° C.) is used. A highest temperature of a south wall exterior surface in the daytime is approximately 38° C. (at 12 o'clock), and a lowest temperature of the south wall exterior surface in the daytime is approximately 17° C. (at 6 o'clock). Therefore, as the latent heat storage member 20 used in the south wall of a building in this region, a latent heat storage material having a phase change temperature of 19° C. to 38° C. (preferably, 19° C. to 27.5° C.) is used.

A highest temperature of a west wall exterior surface in the daytime is approximately 45° C. (at 16 o'clock), and a lowest temperature of the west wall exterior surface in the daytime is approximately 17° C. (at 6 o'clock). Therefore, as the latent heat storage member 20 used in the west wall of a building in this region, a latent heat storage material having a phase change temperature of 19° C. to 45° C. (preferably, 19° C. to 31° C.) is used. A highest temperature of a roof exterior surface in the daytime is approximately 63° C. (at 12 o'clock), and a lowest temperature of the roof exterior surface in the daytime is approximately 20° C. (at 18 o'clock). Therefore, as the latent heat storage member 20 used in the roof of a building in this region, a latent heat storage material having a phase change temperature of 22° C. to 63° C. (preferably, 22° C. to 41.5° C.) is used. Furthermore, an exterior surface temperature of the north wall in which the solar insolation is small approximately similarly accords with the external air temperature.

The phase change temperature of the latent heat storage member 20 used as a building material in a specific region may be determined on the basis of temperature change in the same region or in an adjacent region over a typical day of the summer as described above, or may be determined on the basis of a result in which temperature changes in the same region or in an adjacent region over a plurality of days (for example, for three months from July to September) of the summer are averaged for each time period.

Figure 7:
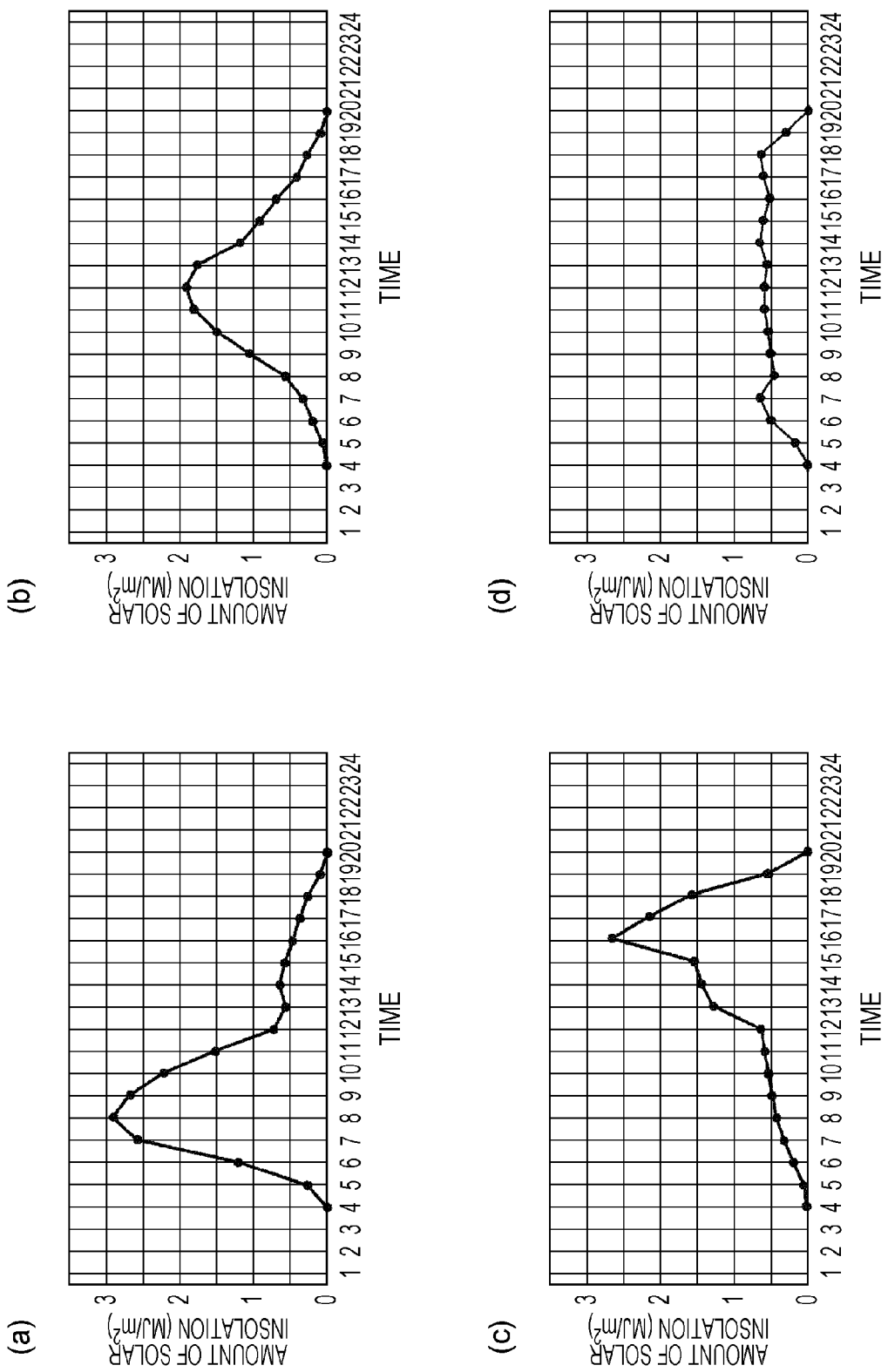
FIG. 7 is a graph illustrating an example of change in an amount of solar insolation with respect to the outer wall in a certain region in Japan in a day.

FIG. 7 is a graph illustrating an example of change in an amount of solar insolation with respect to the outer wall in the same region as that of FIG. 6 in a day. FIG. 7(a) illustrates change in an amount of solar insolation of the east wall, FIG. 7(b) illustrates change in an amount of solar insolation of the south wall, FIG. 7(c) illustrates change in an amount of solar insolation of the west wall, and FIG. 7(d) illustrates change in an amount of solar insolation of the north wall. In graphs of FIGS. 7(a) to (d), a horizontal axis indicates time, and a vertical axis indicates an amount of solar insolation ($MJ/m^2$). As illustrated in the three graphs of FIGS. 7(a) to (c), a time period during which the amount of solar insolation with respect to the respective outer walls (the east wall, the south wall, and the west wall) is high is approximately 4 to 5 hours. For example, when the amount of solar insolation in a time period during which the amount of solar insolation with respect to the east wall is high (four time periods of 7 o'clock, 8 o'clock, 9 o'clock, and 10 o'clock) is integrated, the amount of solar insolation is approximately 10.5 $MJ/m^2$. On the other hand, when a latent heat quantity of the latent heat storage material is 150 kJ/kg, and the density is 790 $kg/m^3$, the latent heat quantity of the latent heat storage material per volume is approximately 120 $MJ/m^3$. Therefore, when the amount of solar insolation (approximately 10.5 $MJ/m^2$) with respect to the east wall in the time period described above is entirely absorbed, it is necessary that a thickness of the latent heat storage member 20 (the latent heat storage material) disposed in the in the east wall be approximately greater than or equal to 8.7 cm.

Figure 8:
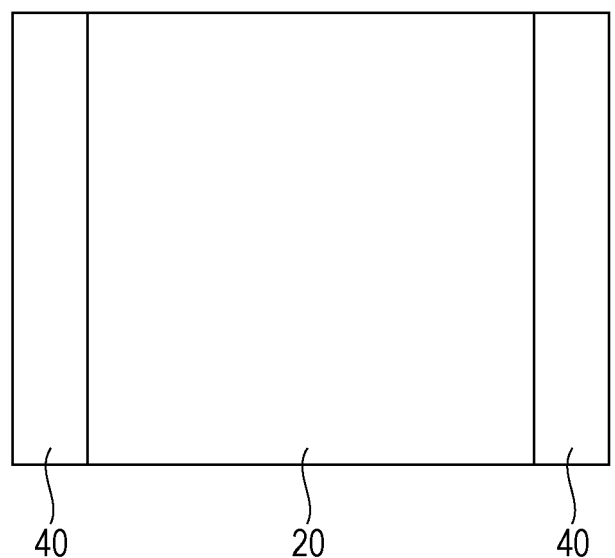
FIG. 8 is a diagram illustrating an example of an attachment method of the latent heat storage member 20 according to the first embodiment of the present invention.

FIG. 8 is a diagram illustrating am example of an attachment method of the latent heat storage member 20 according to this embodiment. In this example, on an outer side of the heat insulation member 10, a plurality of ribs 40 which are a convex on the outdoor side is fixed and disposed. The respective ribs 40 extend in a vertical direction, and are arranged at a predetermined interval in a horizontal direction. Each of a plurality of latent heat storage members 20 is in the shape of a flat plate (for example, a rectangular flat plate or a square flat plate) having a fixed size. A width of each of the latent heat storage members 20 is approximately identical to an interval between the ribs 40. Each of the latent heat storage members 20 is inserted between adjacent ribs 40, and thus is attached to the heat insulation member 10. Furthermore, when the thickness of the latent heat storage member 20 is thin (for example, approximately 5 mm), the latent heat storage member 20 may be attached to the heat insulation member 10 by a method similar to painting.

Here, a consideration of heat insulation and heat storage will be described. Heat insulation is ability to prevent a heat flow. In order to use the heat insulation material as a building material, an optimal climate is a climate in which there are extremes of temperature throughout the year (a climate in which summer is extremely hot, and winter is extremely cold). In contrast, when the heat insulation material is used in a region having a mild climate throughout a year, it is difficult to release heat generated in the building (heat from illumination, electric equipment, a human body, and the like). For this reason, the heat insulation is disadvantageous in a region having a mild climate through a year.

Heat storage is the ability to temporally delay heat flow. In order to use the thermal storage material as a building material, an optimal climate is a climate in which temperature change in a day is large, or a climate in which only one of a heater or a cooler is required. By temporally delaying a peak of a thermal load (a cooling load or a heating load) in a day, it is possible to reduce an operational amount of cooling equipment or heating equipment, and thus it is possible to reduce the cost of equipment. In addition, it is possible to improve efficiency through continuous operation, and thus it is possible to reduce the operational cost. On the other hand, when the thermal storage material is used in a building where a frequency of use is low and a temperature change is large, a response with respect to a control is delayed, and thus a prediction operation taking account of a delay is required in order to obtain required amenities when it is required. For this reason, the heat storage is disadvantageous in such a building.

In the embodiment described above, a case where it is preferable that the phase change temperature T1 be lower than or equal to an average temperature of the lowest temperature Tsmin and the highest temperature Tsmax (T1≤(Tsmin+Tsmax)/2) is described, and then, an optimal condition of the phase change temperature T1 will be described. Here, a case where this embodiment is applied to a west side outer wall in a house will be described. In general, a west side outer wall has small windows and a large heat input from the wall, and thus it is considered that an effect of applying this embodiment is great.

FIG. 9(a) is a graph illustrating weather data for a west side outer wall in a house which is built in Tokyo when it is sunny in August of the summer in Tokyo. A horizontal axis indicates elapsed time, and 0 o'clock is on a left end and 24 o'clock is on a right end. A vertical axis on a left side indicates ambient temperature (° C.). A vertical axis on a right side indicates an amount of solar insolation ($W/m^2$). In the graph, data illustrated by a solid line indicates the external air temperature Tout. In the graph, data illustrated by a dotted line indicates an amount of solar insolation of the west side outer wall.

Figure 27:
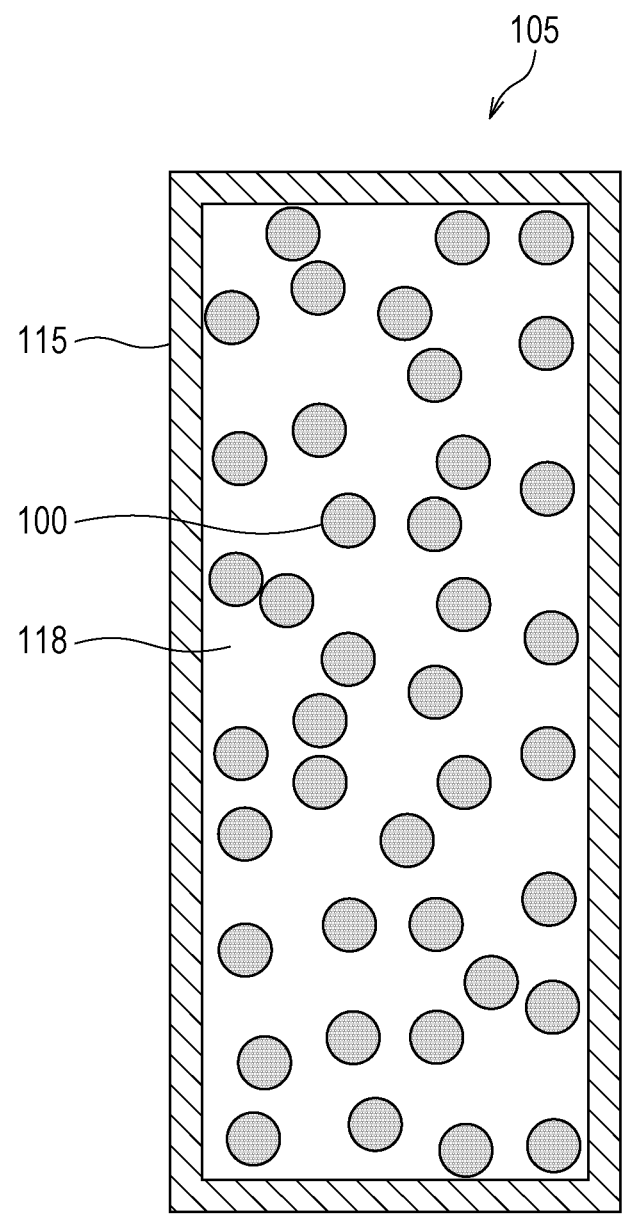
FIG. 27 is a cross-sectional view illustrating a thermal storage material 105 according to the third embodiment of the present invention.

In the external air temperature Tout illustrated in FIG. 9(a), 27.5° C. which is a lowest ambient temperature on the day is recorded at approximately 5 a.m., and 34.3° C. which is a highest ambient temperature on the day is recorded at approximately 11:30 a.m. An ambient temperature from 8 a.m. to 09:30 p.m. exceeds 30° C. On a west side outer wall surface, an amount of solar insolation starts to increase from approximately 7 a.m., and the amount of solar insolation at approximately 1 p.m. is approximately 200 W/m$^2$. After that, the amount of solar insolation increases to 720 W/m$^2$ at approximately 5 p.m., and then rapidly decreases to 0.

By using the weather data illustrated in FIG. 9(a), an increase in a temperature of the west side outer wall due to solar insolation is calculated. In addition, from a temperature difference between a west side outer wall temperature and a room temperature, a heat quantity flowing to the indoor side is integrated as a thermal load. FIG. 9(b) illustrates a calculation model. The west side outer wall is formed by arranging concrete (a thickness of 100 mm), a heat insulation material (a thickness of 30 mm), and a heat storage outer wall (a heat storage member: a thickness of 5 mm) in this order from the indoor side to the outdoor side. An indoor temperature is a room temperature Tin, an outdoor temperature is the external air temperature Tout, a temperature of the heat storage outer wall is an outer wall temperature Ts, and thermal conductivity of the heat storage outer wall is 25 W/(m$^2$/k) taking account of heat radiation by convection and radiation.

As the phase change temperature of the latent heat storage material used in the heat storage outer wall, six temperature ranges of 27° C. to 29° C., 31° C. to 33° C., 35° C. to 37° C., 39° C. to 41° C., 43° C. to 45° C., and 47° C. to 49° C. are included. In addition, as the latent heat storage material, four types of materials of an organic thermal storage material A, an inorganic hydrate B, an inorganic hydrate C in which heat storage microcapsules are dispersed, and a heat storage gypsum board D are considered. A latent heat value of the organic thermal storage material A per unit volume is 158 MJ/m$^3$, and a thermal conductivity is 0.34 W/(m·k). A latent heat value of the inorganic hydrate B per unit volume is 234 MJ/m$^3$, and a thermal conductivity is 1.1 W/(m·k). A latent heat value of the inorganic hydrate C in which the heat storage microcapsules are dispersed per unit volume is 176 MJ/m$^3$, and a thermal conductivity is 0.54 W/(m·k). A latent heat value of the heat storage gypsum board D per unit volume is 55 MJ/m$^3$, and a thermal conductivity is 0.22 W/(m·k). The lowest temperature Tsmin is a temperature (=27° C.) approximately identical to the lowest external air temperature Tout in the daytime. In addition, the highest temperature Tsmax is a temperature (=49° C.) when a temperature of a west side outer wall outer exterior surface is high due to radiation heat of solar light.

Figure 10:
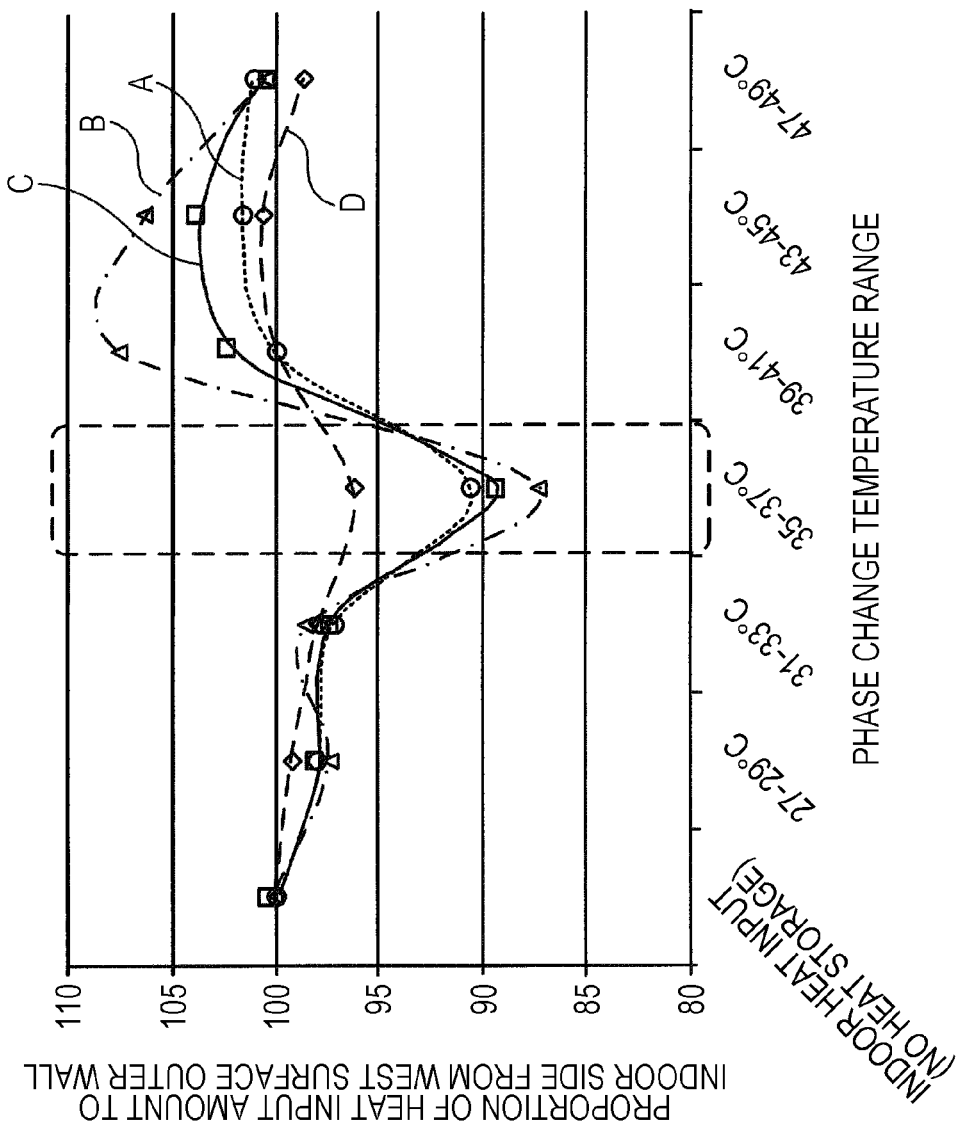
FIG. 10 is a diagram describing optimal conditions for the phase change temperature T1 according to the first embodiment of the present invention.
Figure 11:
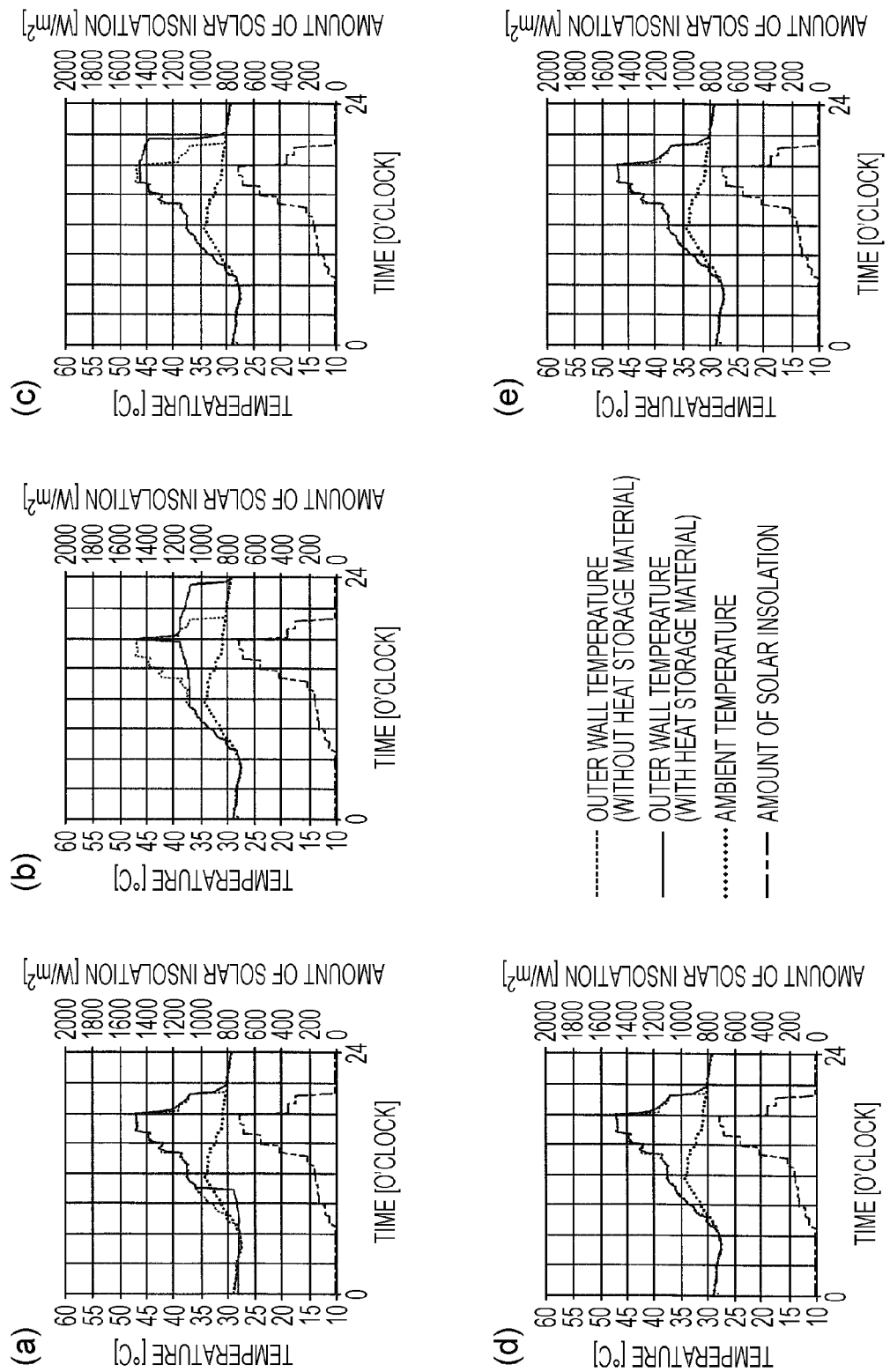
FIG. 11 is a diagram describing optimal conditions for the phase change temperature T1 according to the first embodiment of the present invention.

FIG. 10 is a graph illustrating calculation results. A vertical axis indicates a proportion of a heat input amount from the west side outer wall to the indoor side. In the proportion of the heat input amount, the indoor heat input amount when the thermal storage material is not disposed in the west side outer wall is set to 100. A left end of a horizontal axis indicates a case where the thermal storage material is not disposed in the west side outer wall, and a right side of the horizontal axis indicates a phase change temperature region from a low temperature to a high temperature for 27° C. to 29° C., 31° C. to 33° C., 35° C. to 37° C., 39° C. to 41° C., 43° C. to 45° C., and 47° C. to 49° C. In FIG. 10, a dotted line curve A indicates characteristics of the heat storage outer wall including the organic thermal storage material A in the latent heat storage material. A one dot chain line curve B indicates characteristics of the heat storage outer wall including the inorganic hydrate B in the latent heat storage material. A solid line curve C indicates characteristics of the heat storage outer wall using the inorganic hydrate C in which the heat storage microcapsules are dispersed in the latent heat storage material. A broken line curve D indicates characteristics of the heat storage outer wall using the heat storage gypsum board D in the latent heat storage material.

As illustrated in a broken line frame in FIG. 10, in all of the four types of heat storage outer walls, the proportion of the heat input amount from the west side outer wall to the indoor side is the lowest in the phase change temperature region of 35° C. to 37° C. In addition, in all of the four types of heat storage outer walls, when the phase change temperature region is 39° C. to 41° C., the proportion of the heat input amount exceeds 100, and the heat input amount to the indoor side rapidly increases. For this reason, it is preferable that the phase change temperature T1 be approximately the average temperature of the lowest temperature Tsmin and highest temperature Tsmax (T1≈(Tsmin+Tsmax)/2).

FIGS. 11(a) to 11(e) compare a temperature of an outer wall which is provided with the thermal storage material with a temperature of an outer wall which is not provided with the thermal storage material for the six types of thermal storage materials having different phase change temperatures by using the weather data illustrated in FIG. 9(a). In each drawing of FIG. 11, a horizontal axis indicates elapsed time, and a left end is 0 o'clock and a right end is 24 o'clock. A vertical axis on a left side indicates temperature (° C.). A vertical axis on a right side indicates an amount of solar insolation (W/m$^2$). In the graph, data illustrated by a dotted line indicates the external air temperature Tout. In the graph, data illustrated by a one dot chain line indicates an amount of solar insolation of the west side outer wall. In addition, data illustrated by a solid line indicates the temperature of the outer wall which is provided with the thermal storage material, and data illustrated by a broken line indicates the temperature of the outer wall which is not provided with the thermal storage material.

FIG. 11(a) illustrates a case of the phase change temperature T1≈Tsmin (for example, the phase change temperature T1 is 27° C. to 29° C.) As illustrated in FIG. 11(a), in a period from 7 a.m. to approximately 11 a.m., the external air temperature (the dotted line) increases from approximately 28° C. to 34° C., and the amount of solar insolation (the one dot chain line) increases from 50 W/m$^2$ to exceed 150 W/m$^2$, and thus the temperature of the outer wall which is not provided with the thermal storage material (the broken line) increases from 28° C. to 36° C. In contrast, the temperature of the outer wall which is provided with the thermal storage material (the solid line) is maintained at approximately 28° C. in the same period. Accordingly, it is possible to suppress a heat flow to the indoor side. After 11 a.m., the external air temperature does not fall below 29° C. and the thermal storage material in which the phase change temperature T1 is approximately similar to the lowest temperature Tsmin does not perform heat absorption and radiation using the latent heat, and thus the temperature of the outer wall which is provided with the thermal storage material and the temperature of the outer wall which is not provided with the thermal storage material are approximately identical to each other.

FIG. 11(b) illustrates a case of the phase change temperature T1≈(Tsmin+Tsmax)/2 (for example, the phase change temperature T1 is 37° C. to 39° C.) As illustrated in FIG. 11(b), in a period after 11 a.m. until the outer wall temperature becomes 37° C., the temperature of the outer wall which is provided with the thermal storage material and the temperature of the outer wall which is not provided with the thermal storage material are approximately identical to the outer wall temperature. In a period after 11 a.m. until slightly before 6 p.m., the external air temperature (the dotted line) increases from 34° C. to approximately 31° C., and the amount of solar insolation (the one dot chain line) increases from 160 W/m² to approximately 700 W/m², and thus the temperature (the broken line) of the outer wall which is not provided with the thermal storage material increases from 37° C. to approximately 47° C. In contrast, the temperature (the solid line) of the outer wall which is provided with the thermal storage material is maintained at approximately 37° C. to 39° C. in the same period. Accordingly, it is possible to suppress the heat flow to the indoor side. The thermal storage material has a temperature exceeding the phase change temperature at approximately 6 p.m. thus being able to perform sensible heat absorption, and the temperature rapidly increases to approximately 46° C., but the amount of solar insolation decreases at the time of sunset, and thus the temperature of the outer wall decreases to the phase change temperature again. After that, the temperature of 39° C. to 37° C. is maintained, and the latent heat radiation is performed until approximately 11 p.m. Thus, according to the outer wall which is provided with the thermal storage material having the phase change temperature T1 of approximately (Tsmin+Tsmax)/2, the heat flow is suppressed to be the minimum, and thus it is possible to realize the daily peak shift of the energy consumption.

FIG. 11(c) illustrates a case of the phase change temperature T1>(Tsmin+Tsmax)/2 (for example, the phase change temperature T1 is 45° C. to 47° C.). As illustrated in FIG. 11(c), until approximately 4 p.m. when the outer wall temperature is 45° C., the temperature of the outer wall which is provided with the thermal storage material and the temperature of the outer wall which is not provided with the thermal storage material increase to be approximately identical to each other. In a period after 4 p.m. until slightly before 9 p.m., the outer wall which is provided with the thermal storage material maintains the phase change temperature, and thus the outer wall temperature is maintained to be higher than that of the outer wall which is not provided with the thermal storage material. For this reason, the heat flow to the indoor side tends to increase.

FIG. 11(d) illustrates a case of the phase change temperature T1<Tsmin (for example, the phase change temperature T1 is 25° C. to 27° C.). In addition, FIG. 11(e) illustrates a case of the phase change temperature T1>Tsmax (for example, the phase change temperature T1 is 47° C. to 49° C.). In either of these cases, the heat absorption and radiation by the latent heat is not performed, and thus the outer wall which is provided with the thermal storage material has the same temperature change as that in the outer wall which is not provided with the thermal storage material.

EXAMPLE 3

An effect when paraffin is used as the organic thermal storage material A described above will be described. By using an ambient temperature and an amount of solar insolation data (a sunny day in August) for the summer in Tokyo illustrated in FIG. 9(a), a heat input amount to the indoor side when this embodiment is used in a west surface outer wall was obtained by a simulation. A cross sectional structure of a wall used in the calculation is identical to that illustrated in FIG. 9(b), and a value obtained in advance is used as a thermophysical property value of each member. A thickness of the paraffin is 5 mm, and the paraffin is used by being suitably selected from paraffins having 18 to 22 carbon atoms according to the phase change temperature region. A latent heat value per unit volume and thermal conductivity are 158 MJ/m³ and 0.34 W/(m·K), respectively. 50% of the solar insolation is reflected by the outer wall, and the remaining amount of solar insolation is converted into heat. In addition, when the temperature of the outer wall is high, a thermal transfer rate is 25 [W/m²·K] in consideration of heat radiation due to radiation and convection according to a temperature difference from the external air temperature. The phase change temperature region changes by 2° C. between Tsmin (27° C.) and Tsmax (49° C.), and a proportion when the heat input amount with respect to the indoor side in a case where the thermal storage material is not disposed is set to 100 is obtained. In the graph of FIG. 10, the curve A plotted in a dotted line is the results thereof. Until T1<(Tsmin+Tsmax)/2, the heat input amount has a generally decreasing trend, and approximately at T1≈(Tsmin+Tsmax)/2, an especially great energy conservation effect (the heat input amount with respect to the indoor side is reduced by 10%) is obtained.

EXAMPLE 4

An effect when the inorganic hydrate B is used as a thermal storage material of this example will be described. Data and a structure used in a simulation are identical to that of EXAMPLE 3 except for the thermal storage material. A thickness of the inorganic hydrate is 5 mm, and the inorganic hydrate is used by being suitably selected from the inorganic hydrate materials described above according to the phase change temperature region. A latent heat value per unit volume and thermal conductivity are 234 MJ/m³ and 1.1 W/(m·K), respectively. 50% of the solar insolation is reflected by the outer wall, and the remaining amount of solar insolation is converted into heat. In addition, when the temperature of the outer wall is high, a thermal transfer rate is 25 [W/m²·K] in consideration of heat radiation due to radiation and convection according to a temperature difference from the external air temperature. The phase change temperature region changes by 2° C. between Tsmin (27° C.) and Tsmax (49° C.), and a proportion when the heat input amount with respect to the indoor side in a case where the thermal storage material is not disposed is set to 100 is obtained. In the graph of FIG. 10, the curve B plotted in a one dot chain line is the results thereof. Until T1<(Tsmin+Tsmax)/2, the heat input amount has a generally decreasing trend, and approximately at T1≈(Tsmin+Tsmax)/2, an especially great energy conservation effect (the heat input amount with respect to the indoor side is reduced by 13%) is obtained.

EXAMPLE 5

An effect when the heat storage microcapsules are used as a thermal storage material of this example will be described. Data and a structure used in a simulation are identical to that of EXAMPLE 3 except for the thermal storage material. When the heat storage microcapsules, for example, include paraffin, as illustrated in FIG. 24(a), an oil phase 142 in which paraffin and isocyanate are dissolved or dispersed is poured into a water phase 141 in a manufacturing container 140, and is violently stirred. Then, as illustrated in FIG. 24(b), an oil-in-water (O/W type) emulsion 143 is obtained. When an aqueous solution 144 in which aqueous amine, or a dihydric alcohol and slide-ring molecules are dissolved or dispersed is poured into the oil-in-water emulsion 143, in an interface between an oil drops and the water phase, isocyanate dissolved in the oil drops and amine, or the dihydric alcohol and the slide-ring molecule in the water phase react. According to this reaction, a wall substance is created to surround the oil drops in which the thermal storage substances are dissolved or dispersed. Accordingly, as illustrated in FIG. 24(c), a microcapsule slurry 145 is created. The microcapsule slurry 145 is filtered, and thus heat storage microcapsules having an average particle diameter of 6 μm are obtained. The heat storage microcapsules are dispersed in the inorganic hydrate thermal storage substance at a concentration of 45 wt %, and thus an inorganic hydrate in which the heat storage microcapsules are dispersed is obtained.

A thickness of the inorganic hydrate in which the heat storage microcapsules are dispersed is 5 mm, and the paraffin and the inorganic hydrate material described above are used by being suitably selected according to the phase change temperature region. A latent heat value per unit volume and thermal conductivity are 196 MJ/m$^3$ and 0.5 W/(m·K), respectively. 50% of the solar insolation is reflected by the outer wall, and the remaining amount of solar insolation is converted into heat. In addition, when the temperature of the outer wall is high, a thermal transfer rate is 25 [W/m$^2$·K] in consideration of heat radiation by radiation and convection according to a temperature difference from the external air temperature. The phase change temperature region changes by 2° C. between Tsmin (27° C.) and Tsmax (49° C.), and a proportion when the heat input amount with respect to the indoor side in a case where the thermal storage material is not disposed is set to 100 is obtained. In the graph of FIG. 10, the curve C plotted in a solid line is the results thereof. Until T1<(Tsmin+Tsmax)/2, the heat input amount has a generally decreasing trend, and approximately at T1≈(Tsmin+Tsmax)/2, an especially great energy conservation effect (the heat input amount with respect to the indoor side is reduced by 10%) is obtained.

EXAMPLE 6

An effect when the inorganic hydrate in which the heat storage microcapsules are dispersed is used as a thermal storage material of this example will be described. Data and a structure used in a simulation are identical to that of EXAMPLE 3 except for the thermal storage material. The heat storage microcapsule is manufactured by the same method as that in EXAMPLE 5. The heat storage microcapsules are dispersed in a gypsum board at a concentration of 33 wt %, and thus a member having both functions of heat storage and the gypsum board is obtained.

A thickness of the heat storage gypsum board is 5 mm, and the paraffin described above is used by being suitably selected according to the phase change temperature region. A latent heat value per unit volume and thermal conductivity are 55 MJ/m$^3$ and 0.22 W/(m·K), respectively. 50% of the solar insolation is reflected by the outer wall at 50%, and the remaining amount of solar insolation is converted into heat. In addition, when the temperature of the outer wall increases, a thermal transfer rate is 25 [W/m$^2$·K] in consideration of heat radiation by radiation and convection according to a temperature difference from the external air temperature. The phase change temperature region changes by 2° C. between Tsmin (27° C.) and Tsmax (49° C.), and a proportion when the heat input amount with respect to the indoor side in a case where the thermal storage material is not disposed is set to 100 is obtained. In the graph of FIG. 10, the curve D plotted in a broken line is the results thereof. Until T1<(Tsmin+Tsmax)/2, the heat input amount has a generally decreasing trend, and approximately at T1≈(Tsmin+Tsmax)/2, an especially great energy conservation effect (the heat input amount with respect to the indoor side is reduced by 4%) is obtained.

[Second Embodiment]

Figure 12:
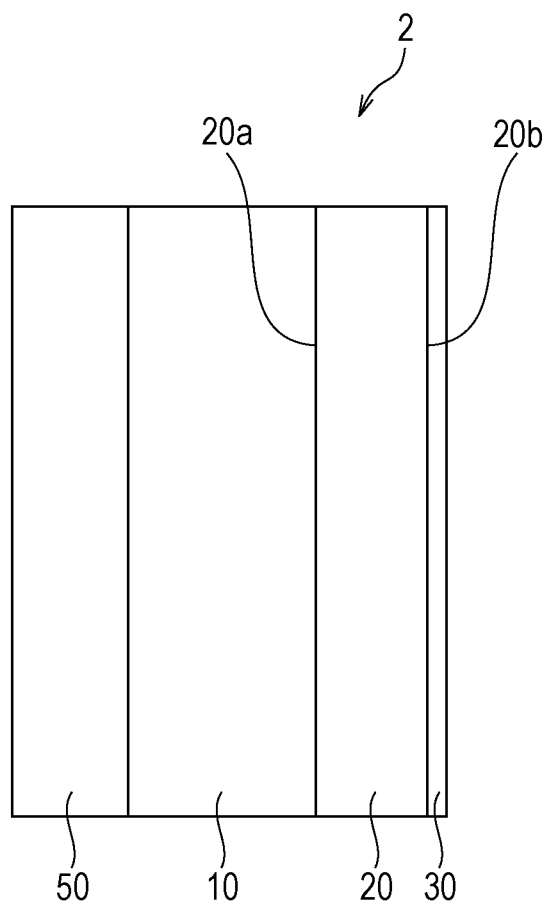
FIG. 12 is a diagram illustrating a schematic cross sectional configuration of a latent heat storage member 20 and a wall material 2 provided with the latent heat storage member 20 according to a second embodiment of the present invention.

Next, a latent heat storage member and a building material provided with the latent heat storage member according to a second embodiment of the present invention will be described by using FIG. 12 and FIG. 13. FIG. 12 illustrates a schematic cross sectional configuration of a latent heat storage member 20 and a wall material 2 provided with the latent heat storage member 20 according to this embodiment. In FIG. 12, a left side indicates an indoor side, and a right side indicates an outdoor side. In addition, the wall material 2 illustrated in FIG. 12 is used in an outer wall facing a direction from which solar light is able to be emitted in a building such as a house. Furthermore, the same reference numerals are applied to constituents having functions and operations which are identical to those of the latent heat storage member and the building material according to the first embodiment, and the description thereof will be omitted.

As illustrated in FIG. 12, the wall material 2 has a configuration in which the latent heat storage member 20, a heat insulation member 10 arranged on an inner side (an indoor side) of the latent heat storage member 20, and another latent heat storage member 50 arranged on the indoor side of the heat insulation member 10 are further laminated. That is, the wall material 2 includes the another latent heat storage member 50 on the indoor side of the heat insulation member 10 in addition to the configuration of the wall material 1 of the first embodiment. Each of the heat insulation member 10, and the latent heat storage members 20 and 50 are in the shape of a flat plate. On an outdoor side of the latent heat storage member 20, an outer wall material 30 is arranged. Similar to the first embodiment, a temperature of an outer side surface of the outer wall material 30 is approximately identical to a temperature of an outer side surface 20b of the latent heat storage member 20.

Similar to the latent heat storage member 20, the latent heat storage member 50 has a configuration in which a latent heat storage material is sealed with a predetermined film. An outer side surface of the latent heat storage member 50 is in contact with or adjacent to an inner side surface of the heat insulation member 10. The latent heat storage member 50 (the latent heat storage material) has a phase change temperature (a melting point) T2 lower than a phase change temperature T1 of the latent heat storage member 50 (T1>T2). In other words, the wall material 2 includes the heat insulation member 10, the latent heat storage member 20 which is laminated on one exterior surface side of the heat insulation member 10 and has a predetermined phase change temperature T1, and the another latent heat storage member 50 which is laminated on the other exterior surface side of the heat insulation member 10 and has a phase change temperature T2 different from the phase change temperature T1. The phase change temperature T2 of the latent heat storage member 50 is able to be measured by a differential scanning calorimeter. Similar to the latent heat storage member 20, the latent heat storage member 50 of this example has a configuration in which the latent heat storage material formed by a material including paraffin and a gelation agent is sealed with a predetermined film.

Figure 13:
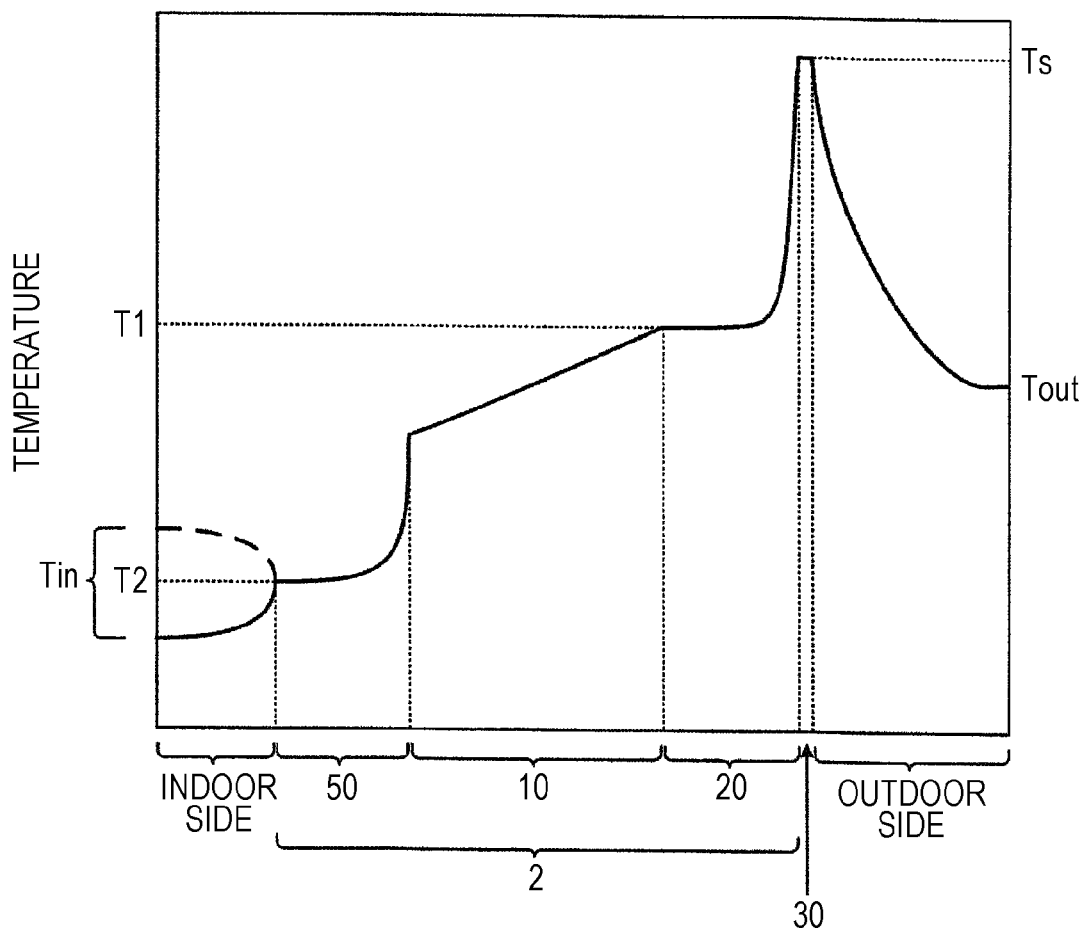
FIG. 13 is a diagram illustrating an example of a temperature gradient of the wall material 2 according to the second embodiment of the present invention at a timepoint in the daytime of the summer.

FIG. 13 illustrates an example of a temperature gradient of the wall material 2 or the like at a timepoint in the daytime of the summer. In FIG. 13, a left side indicates an indoor side, and a right side indicates an outdoor side. A vertical direction indicates temperature. Similar to the first embodiment, the phase change temperature T1 of the latent heat storage member 20 is in the temperature range between an external air temperature Tout and an exterior surface temperature Ts, and thus even when a temperature Ts of the outer side surface 20b of the latent heat storage member 20 increases due to solar insolation, heat transferred inside the latent heat storage member 20 is absorbed as melting heat when the latent heat storage member 20 is subjected to a phase change from a solid phase to a liquid phase. Therefore, it is possible to prevent a heat input from the outdoor side to the indoor side, and it is possible to suppress an increase in an indoor temperature. In addition, similar to the first embodiment, after the weather changes to being cloudy from being sunny, or after sunset, the exterior surface temperature Ts decreases to approximately the external air temperature Tout which is lower than the phase change temperature T1 of the latent heat storage member 20. Therefore, heat accumulated in the latent heat storage member 20 as the melting heat is released to the outdoor side as heat of solidification when the latent heat storage member 20 is subjected to the phase change from the liquid phase to the solid phase.

In addition, the phase change temperature T2 of the latent heat storage member 50 is set in a temperature variation range of an indoor temperature Tin (for example, in a set temperature range of indoor cooling equipment). Accordingly, when the indoor temperature Tin is lower than the phase change temperature T2, a temperature of the latent heat storage member 50 decreases according to a heat exchange with indoor air, and the latent heat storage member 50 solidifies, and thus the heat of solidification is released to the indoor side. In contrast, when the indoor temperature Tin is higher than the phase change temperature T2, the temperature of the latent heat storage member 50 increases due to heat exchange with the indoor air, and the latent heat storage member 50 melts, and thus the melting heat is absorbed from the indoor side. In other words, when the indoor temperature Tin is lower than the phase change temperature T2, the latent heat storage member 50 absorbs cold heat from the indoor side, and when the indoor temperature Tin is higher than the phase change temperature T2, the latent heat storage member 50 releases the cold heat to the indoor side. Therefore, the indoor temperature is maintained to be approximately constant by the latent heat storage member 50 disposed on an inner side of the heat insulation member 10.

In addition, the heat insulation member 10 is disposed between the latent heat storage member 50 and the latent heat storage member 20 having a different phase change temperature, and thus it is possible to prevent heat storage efficiency of the latent heat storage member 50 and the latent heat storage member 20 from being degraded by a temperature difference between the phase change temperature T2 and the phase change temperature T1.

The present invention is not limited to the embodiments described above, and is able to be variously modified.

For example, in the embodiments described above, a case where the latent heat storage member 20 is applied to the wall materials 1 and 2 is described as an example, but the present invention is not limited thereto, and is able to be applied to another building material (for example, a roof material) by which it is possible to increase the exterior surface temperature by solar insolation.

In addition, in the embodiments described above, a gel-like latent heat storage material which does not have liquidity in a liquid phase state is described as an example, but the present invention is not limited thereto, and a latent heat storage material having liquidity in the liquid phase state is able to be used. In addition, paraffin of the organic material as the latent heat storage material is described as an example, and an inorganic hydrated salt may be used. The latent heat storage material using the inorganic hydrated salt does not have flammability, and thus there is no restriction on an inflammable material in building standards. Therefore, it is possible to improve a degree of freedom in arrangement of the latent heat storage member.

In addition, in the embodiments described above, the wall materials 1 and 2 having a configuration in which the latent heat storage member 20 is laminated with the heat insulation member 10, the another latent heat storage member 50, or the like are described as an example, but the present invention is not limited thereto, and is able to be applied to a wall material (a building material) formed of a single layered latent heat storage member 20, or a wall material (a building material) having a configuration in which the latent heat storage member 20 and the outer wall material 30 are laminated.

[Third Embodiment]

Figure 14:
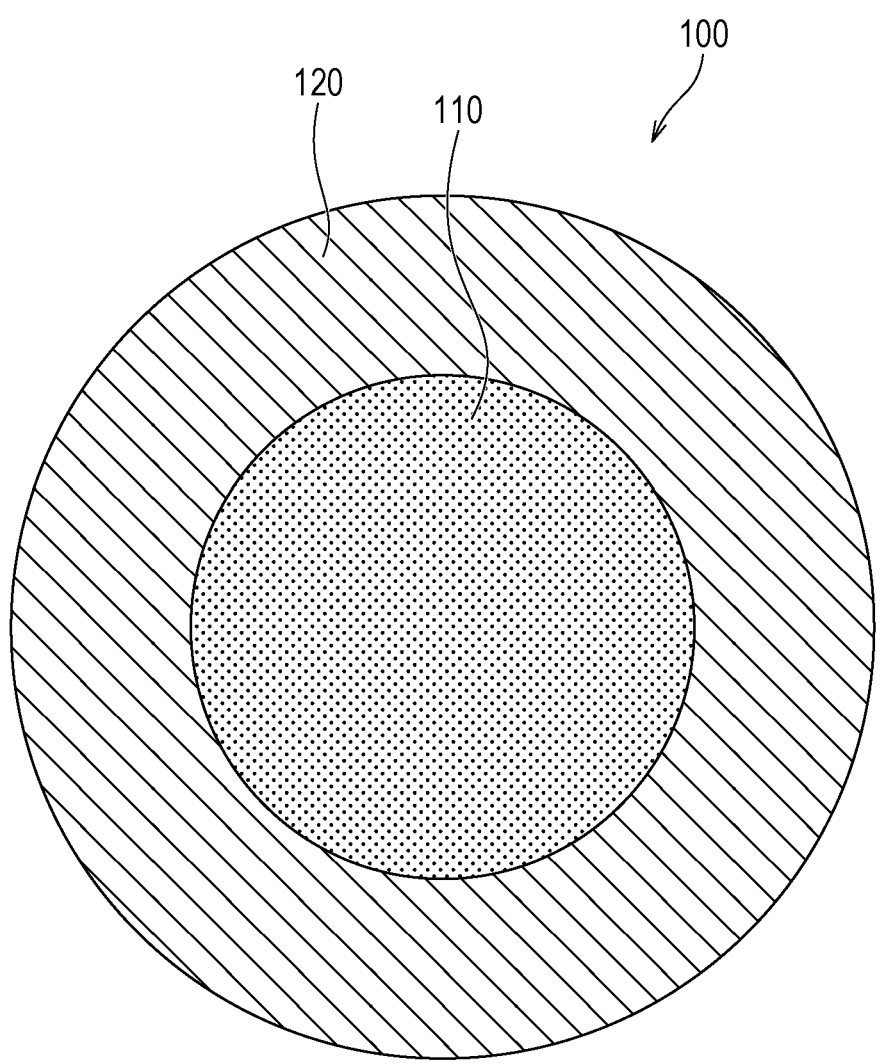
FIG. 14 is a schematic cross-sectional view of a microcapsule 100 according to a third embodiment of the present invention.

Microcapsules 100 and a thermal storage material 105 using the microcapsules 100 according to a third embodiment of the present invention will be described by using FIG. 14 to FIG. 27. Furthermore, in all of the following drawings, in order to facilitate understanding, each constituent is illustrated with dimensions and the scale thereof being suitably changed. FIG. 14 is a schematic cross-sectional view of the microcapsule 100 according to this embodiment.

The microcapsule 100 is in the shape of a sphere. The microcapsule 100 includes a thermal storage substance 110 as a core substance. In this embodiment, as the thermal storage substance 110, an organic material or an inorganic material is able to be used. As the thermal storage substance 110 using the organic material, for example, paraffin is included. Paraffin is a general term for saturated chain type hydrocarbons denoted by a general formula $C_nH_{2n+2}$. In addition, as the thermal storage substance 110 using the organic material, a fatty acid-based material, a higher alcohol-based material, an aldehyde-based material, and an ester-based material are also included. In addition, as the thermal storage substance 110 using an inorganic material, for example, water or an aqueous inorganic salt solution in which an inorganic salt is added to water is included. As the inorganic salt, for example, sodium chloride (NaCl), calcium chloride ($CaCl_2$), magnesium chloride ($MgCl_2$), ammonium chloride ($NH_4Cl$), potassium chloride (KCl), and the like are used.

The thermal storage substance 110 is subjected to a reversible phase change between a solid phase and a liquid phase at a predetermined phase change temperature. When a single paraffin is used in the thermal storage substance 110, the phase change temperature changes according to the number of carbon atoms n. In addition, when a mixture of two or more types of paraffin is used in the thermal storage substance 110, it is possible to adjust the phase change temperature by changing a mixing ratio. For example, when tetradecane having 14 carbon atoms is used in the thermal storage substance, it is possible to set the phase change temperature to 6° C. In addition, when a mixture of tetradecane and a paraffin having more than 14 carbon atoms is used in the thermal storage substance, the phase change temperature is able to be higher than 6° C. In addition, when water is used in the thermal storage substance 110, it is possible to set the phase change temperature to 0° C. In addition, when an aqueous inorganic salt solution is used in the thermal storage substance 110, the phase change temperature is able to be lower than 0° C.

In addition, a volume of the thermal storage substance 110 changes at the time of the phase change. For example, when the phase change from the solid phase to the liquid phase occurs, a volume of the thermal storage substance 110 using paraffin expands, and when the phase change from the liquid phase to the solid phase occurs, the volume contracts. In addition, for example, when the phase change from the solid phase to the liquid phase occurs, a volume of the thermal storage substance 110 using water or an aqueous inorganic salt solution contracts, and when the phase change from the liquid phase to the solid phase occurs, the volume expands.

The microcapsule 100 includes a wall substance 120 encapsulating the thermal storage substance 110. The wall substance 120 is a capsule wall of the microcapsule 100. In this embodiment, the wall substance 120 is configured of a polyurea or a polyurethane. By using FIG. 15 and FIG. 16, a polyurea or a polyurethane used in the wall substance 120 will be described.

FIG. 15 illustrates a polyurea reaction in which a polyurea is created. The polyurea is created by performing addition polymerization with respect to isocyanate including two isocyanate groups and an $R_1$ group, and an amine including two amine groups and an $R_2$ group. Specifically, the isocyanate group and the amine group are subjected to an additive reaction, the $R_1$ group and the $R_2$ group are connected by a urea bond, and thus the polyurea is created.

In this embodiment, as an isocyanate, for example, an isocyanate monomer such as m-phenylene diisocyanate, 2,4-tolylene diisocyanate, 2,6-tolylene diisocyanate, toluene-2,4,6-diisocyanate, diphenylmethane-4,4'-diisocyanate, naphthalene-1,5-diisocyanate, 1,6-hexamethylene diisocyanate, dicyclohexyl methane-4,4'-diisocyanate, norbornane diisocyanate, and isophorone diisocyanate are used. In addition, as an isocyanate, an isocyanate oligomer or an isocyanate polymer such as polymethylene polyphenyl polyisocyanate is used. Further, as an isocyanate, an adduct of hexamethylene isocyanate and trimethylolpropane, an adduct of tolylene diisocyanate and hexane triol, and a biuret adduct of hexamethylene diisocyanate, an isocyanate monomer, a polyol-modified product or a carbodiimide-modified product of an isocyanate oligomer or an isocyanate polymer, and the like are used.

In addition, in this embodiment, as an amine, ethylenediamine, 1,2-propanediamine, 1,3-propanediamine, 1,4-diaminobutane, hexamethylenediamine, 2,5-dimethyl-2,5-hexanediamine, 2,2,4-trimethylhexamethylenediamine, diethylenetriamine, triethylenetetramine, tetraethylenepentamine, pentaethylenehexamine, 4-aminomethyloctamethylenediamine, 3,3-imino-bis(propylamine), 3,3'-methylimino-bis(propylamine), bis(3-aminopropyl)ether, 1,2-bis(3-aminopropyloxy)ethane, menthenediamine, isophorone diamine, bis-aminomethylnorbornane, bis(4-aminocyclohexyl)methane, bis(4-amino-3-methylcyclohexyl)methane, 1,3-diaminocyclohexane, 3,9-bis(3-aminopropyl)-2,4,8,10-tetraoxaspiro[5,5]undecane, and the like are able to be used. In addition, as an amine, an aliphatic polyamine including an aromatic substituent group such as m-xylylenediamine and tetrachloro-p-xylylenediamine is able to be used.

FIG. 16 is a reaction formula of a polyurethane reaction in which a polyurethane is created. The polyurethane is created by performing addition polymerization with respect to an isocyanate including two isocyanate groups and an $R_1$ group, and a dihydric alcohol including two hydroxyl groups and an $R_3$ group. Specifically, the isocyanate group and the hydroxyl group are subjected to an additive reaction, the $R_1$ group and the $R_3$ group are connected by a urethane bond, and thus the polyurethane is created.

In this embodiment, as a dihydric alcohol including the $R_3$ group, for example, ethylene diol, 1,2-propanediol, 1,4-butanediol, hexamethylenediol, 2,5-dimethyl-2,5-hexanediol, 2,2,4-trimethylhexamethylenediol, diethylenetriol, 4-aminomethyloctamethylenediol, and the like are able to be used.

Figure 17:
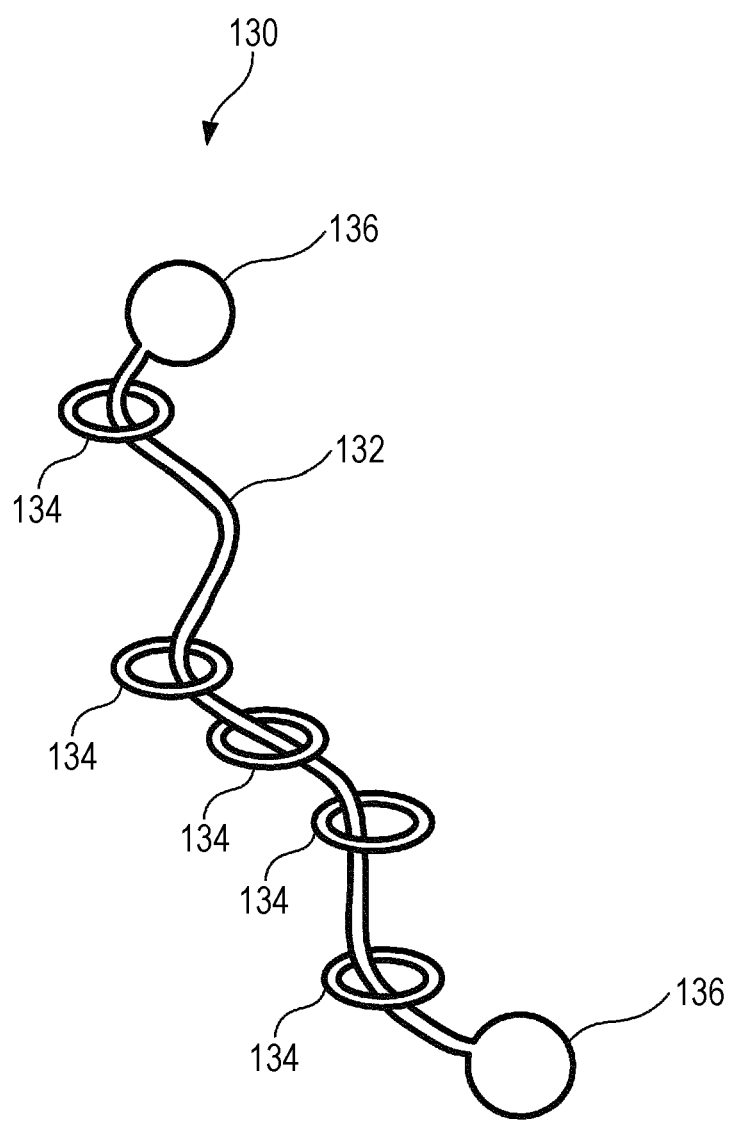
FIG. 17 is a schematic view illustrating a structure of a slide-ring molecule 130 which is introduced into a wall substance 120 of the microcapsule 100 according to the third embodiment of the present invention.

Next, the slide-ring molecule 130 which is introduced into the wall substance 120 of the microcapsule 100 according to this embodiment will be described by using FIG. 17. FIG. 17 is a schematic view illustrating a structure of the slide-ring molecule 130. The slide-ring molecule 130 includes a linear molecule 132 (for example, at least one compound selected from a polyethylene glycol, a polycaprolactone, a polyisoprene, a polyisobutylene, a polybutadiene, a polypropylene glycol, a polytetrahydrofuran, a polydimethyl siloxane, a polyethylene, or polypropylene), a plurality of cyclic molecules 134 (for example, at least one cyclodextrin selected from α-cyclodextrins, β-cyclodextrins, or γ-cyclodextrins) performing clathration with respect to the linear molecule 132, and two blocking groups 136 (for example, at least one compound selected from dinitrophenyl groups, cyclodextrins, adamantane groups, trityl groups, fluorescein groups, or pyrenes) arranged on both terminals of the linear molecule 132. In an example illustrated in FIG. 17, the linear molecule 132 is subjected to clathration by five cyclic molecules 134. The cyclic molecule 134 is able to be freely moved in an extending direction of the linear molecule 132. The cyclic molecule 134 is prevented from falling out from the linear molecule 132 by the two blocking groups 136 arranged on the both terminals of the linear molecule 132.

The slide-ring molecule 130 has a molecular assembly structure in which the plurality of cyclic molecules 134 passes through the linear molecule 132. Large molecules having the molecular assembly structure are referred to as a polyrotaxane. The slide-ring molecule 130 used in this embodiment is a polyrotaxane configured of the linear molecule 132, the cyclic molecule 134, and the blocking group 136.

The slide-ring molecule 130 includes a functional group of a hydroxyl group or an amine group in the cyclic molecule 134. The polyurea or the polyurethane, and the slide-ring molecule 130 which configure the wall substance 120 are connected by a polymer chain of the polyurea or the polyurethane, and the cyclic molecule 134. A connection portion between the polymer chain of the polyurea or the polyurethane and the cyclic molecule 134 is a crosslinking point. The cyclic molecule 134 is able to be freely moved in the extending direction of the linear molecule 132, and thus the crosslinking point is able to be freely moved. For this reason, the crosslinking point moves to a position where a tensile force of the wall substance 120 is even, and thus it is possible to make stress in the wall substance 120 uniform. Accordingly, it is possible to prevent large stress from being locally applied to the wall substance 120, and thus it is possible to improve durability of the wall substance 120.

As the linear molecule 132, for example, a polyethylene glycol or a polycaprolactone is used. As the cyclic molecule 134 including the hydroxyl group, for example, at least one cyclodextrin selected from α-cyclodextrin, β-cyclodextrin, or γ-cyclodextrin is used. As the cyclic molecule 134 including the amine group, for example, aminated cyclodextrin or cyclic amide is used. As the blocking group 136, for example, an adamantane group is used.

Figure 18:
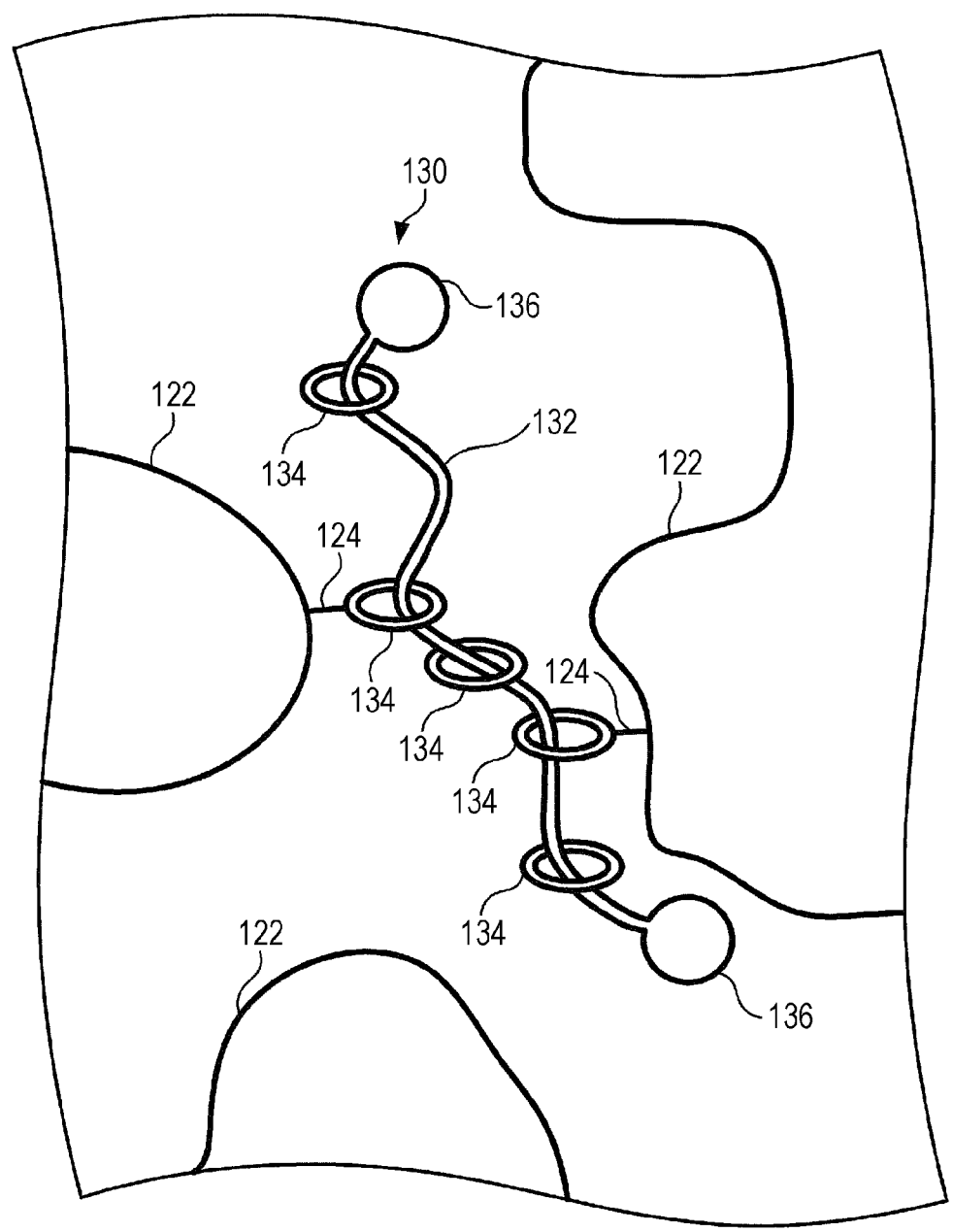
FIG. 18 is a schematic view in which the wall substance 120 of the microcapsule 100 according to the third embodiment of the present invention is enlarged.
Figure 19:
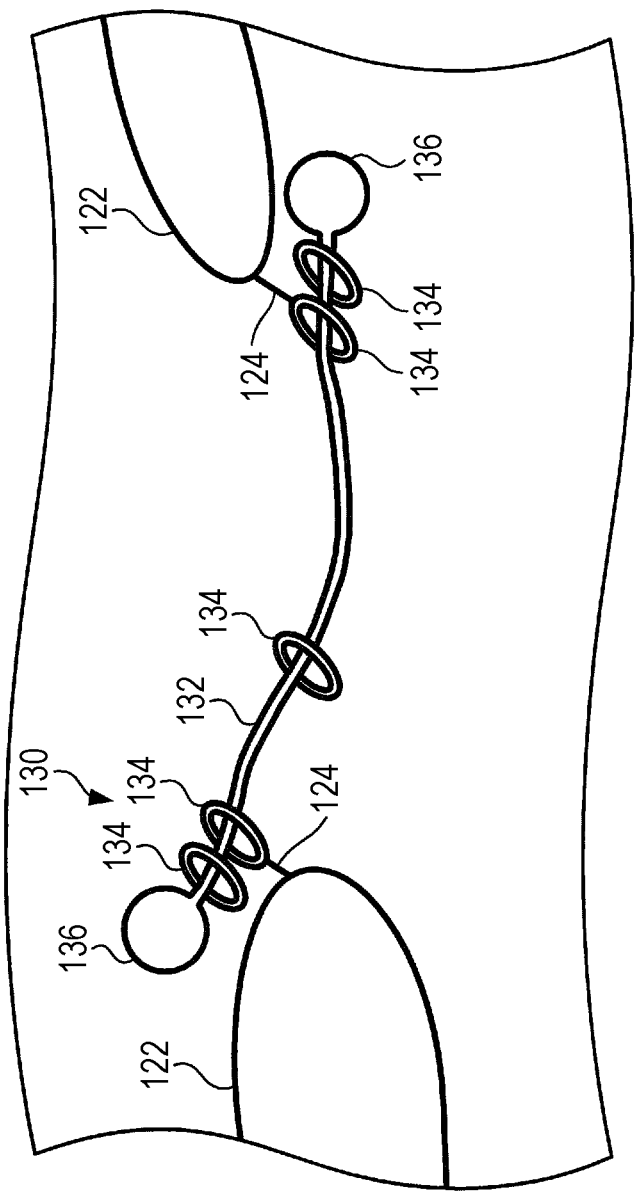
FIG. 19 is a schematic view in which the wall substance 120 of the microcapsule 100 according to the third embodiment of the present invention is enlarged.

Next, the wall substance 120 of the microcapsule 100 according to this embodiment will be described in detail by using FIG. 18 and FIG. 19. FIG. 18 and FIG. 19 are schematic views in which the wall substance 120 is enlarged. In FIG. 18, a state of the wall substance 120 when the volume of the thermal storage substance 110 (not illustrated in FIG. 18) contracts is illustrated. As illustrated in FIG. 18, the wall substance 120 includes polymer chains 122 of the polyurea or the polyurethane, and the slide-ring molecule 130. The slide-ring molecule 130 is arranged in a gap between the polymer chains 122.

The polymer chains 122 and one cyclic molecule 134 are connected by a chemical bond (a urea bond or a urethane bond). A connection portion between the polymer chain 122 and the one cyclic molecule 134 of the slide-ring molecule 130 is a crosslinking point 124. In an example illustrated in FIG. 18, toward a plane of paper, a second cyclic molecule 134 from a top portion is crosslinked with the polymer chain on a left side, and a second cyclic molecule 134 from a bottom portion is crosslinked with the polymer chain 122 on a right side.

From the state illustrated in FIG. 18, the volume of the thermal storage substance 110 expands according to the phase change. A state of the wall substance 120 in this case will be described by using FIG. 19. As illustrated in FIG. 19, when the volume of the thermal storage substance 110 (not illustrated in FIG. 19) included in the wall substance 120 expands, the polymer chain 122 moves in an in-plane direction of a wall surface of the capsule wall, and thus a gap between the polymer chains 122 is widened. In an example illustrated in FIG. 19, toward a plane of paper, the polymer chain 122 on the right side is moved to a right side in the in-plane direction, and the polymer chain 122 on the left side is moved to a left side in the in-plane direction. In addition, the crosslinking point 124 is moved according to the movement of the polymer chain 122. The cyclic molecule 134 is moved according to the movement of the crosslinking point 124. The cyclic molecule 134 is blocked by the linear molecule 134 by the blocking group 136, and thus the linear molecule 132 is pulled the in-plane direction according to the movement of the cyclic molecule 134.

When the gap between the polymer chains 122 is widened, the crosslinking point 124 is moved to a position where a tensile force of the polymer chain 122 is even. The crosslinking point 124 moves, and thus nonuniformity in stress in the wall substance 120 is able to be dispersed. In addition, the crosslinking point 124 freely moves, and thus it is possible to prevent a molecular chain or a crosslinking point of the large molecules in the wall substance 120 from being cut.

Figure 20:
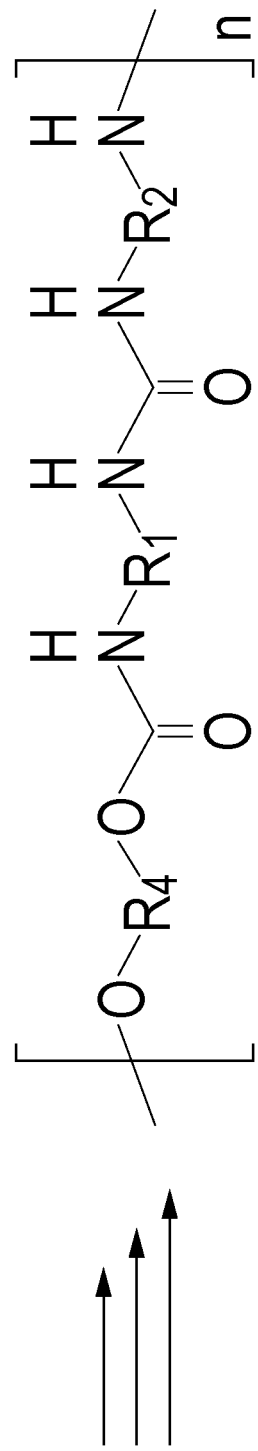
FIG. 20 is a reaction formula of a reaction example when a slide-ring molecule 130 including a polyurea and a hydroxyl group is used in the wall substance 120 of the microcapsule 100 according to the third embodiment of the present invention.

Next, a reaction example when the wall substance 120 according to this embodiment is created will be described by using FIG. 20 to FIG. 23 with reference to FIG. 18 and FIG. 19. First, a reaction example when the slide-ring molecule 130 including the hydroxyl group is introduced into the wall substance 120 using polyurea will be described by using FIG. 20. FIG. 20 illustrates a reaction formula in which an isocyanate including two isocyanate groups and a $R_1$ group, an amine including two amine groups and a $R_2$ group, and the slide-ring molecule 130 including two hydroxyl groups and a $R_4$ group are subjected to addition polymerization. The $R_4$ group includes the linear molecule 132, the cyclic molecule 134, and the blocking group 136 illustrated in FIG. 18 and FIG. 19. The two hydroxyl groups which are bonded to the $R_4$ group are provided in the cyclic molecule 134 illustrated in FIG. 18 and FIG. 19.

As illustrated in FIG. 20, the isocyanate group and the amine group are subjected to the additive reaction, and the $R_1$ group and the $R_2$ group are connected by the urea bond. In addition, the isocyanate group and the hydroxyl group are subjected to the additive reaction, and the $R_1$ group and the $R_4$ group are connected by the urethane bond.

Thus, the isocyanate group and the hydroxyl group of the cyclic molecule 134 are subjected to the additive reaction, and the polyurea and the slide-ring molecule 130 are connected by the urethane bond. A urethane bond portion is the crosslinking point 124 at which the polyurea and the slide-ring molecule 130 are crosslinked.

Figure 21:
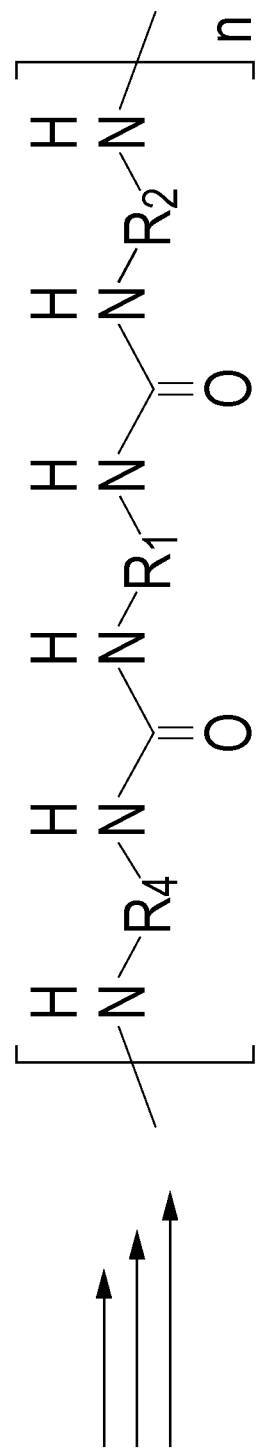
FIG. 21 is a reaction formula of a reaction example when a slide-ring molecule 130 including a polyurea and an amine group is used in the wall substance 120 of the microcapsule 100 according to the third embodiment of the present invention.

Next, a reaction example when the slide-ring molecule 130 provided with the amine group is introduced into the wall substance 120 using polyurea will be described by using FIG. 21. FIG. 21 illustrates a reaction formula in which an isocyanate including two isocyanate groups and an $R_1$ group, an amine including two amine groups and an $R_2$ group, and the slide-ring molecule 130 including two amine groups and an $R_4$ group are subjected to addition polymerization. The two amine groups which are bonded to the $R_4$ group are provided in the cyclic molecule 134 illustrated in FIG. 18 and FIG. 19.

As illustrated in FIG. 21, the isocyanate group and the amine group are subjected to the additive reaction, and the $R_1$ group and the $R_2$ group are connected by the urea bond. In addition, the isocyanate group and the amine group are subjected to the additive reaction, and the $R_1$ group and the $R_4$ group are connected by the urea bond.

Thus, the isocyanate group and the hydroxyl group of the cyclic molecule 134 are subjected to the additive reaction, and the polyurea and the slide-ring molecule 130 are connected by the urea bond. A urea bond portion is the crosslinking point 124 at which the polyurea and the slide-ring molecule 130 are crosslinked.

Figure 22:
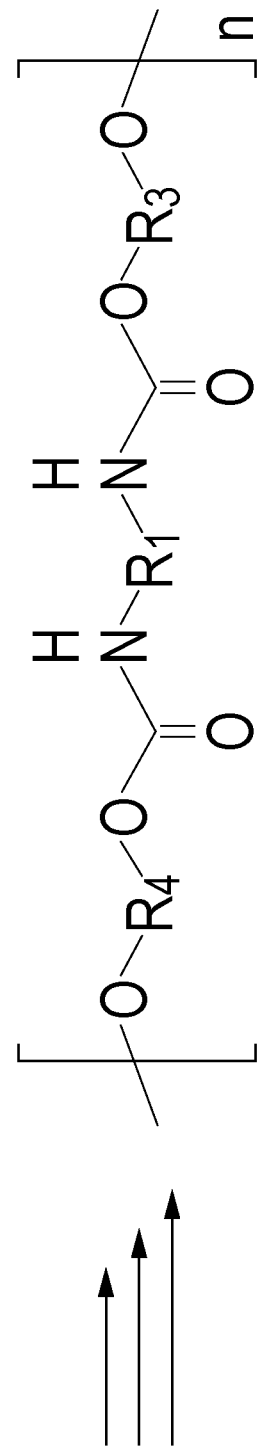
FIG. 22 is a reaction formula of a reaction example when a slide-ring molecule 130 including a polyurethane and a hydroxyl group is used in the wall substance 120 of the microcapsule 100 according to the third embodiment of the present invention.

Next, a reaction example when the slide-ring molecule 130 provided with the hydroxyl group is introduced into the wall substance 120 using polyurethane will be described by using FIG. 22. FIG. 22 illustrates a reaction formula in which an isocyanate including two isocyanate groups and an $R_1$ group, an alcohol including two hydroxyl groups and an $R_3$ group, and the slide-ring molecule 130 including two hydroxyl groups and an $R_4$ group are subjected to addition polymerization. The two hydroxyl groups which are bonded to the $R_4$ group are provided in the cyclic molecule 134 illustrated in FIG. 18 and FIG. 19.

As illustrated in FIG. 22, the isocyanate group and the hydroxyl group are subjected to the additive reaction, and the $R_1$ group and the $R_3$ group are connected by the urethane bond. In addition, the isocyanate group and the hydroxyl group are subjected to the additive reaction, and the $R_1$ group and the $R_4$ group are connected by the urethane bond.

Thus, the isocyanate group and the hydroxyl group of the cyclic molecule 134 are subjected to the additive reaction, and the polyurea and the slide-ring molecule 130 are connected by the urethane bond. A urethane bond portion is the crosslinking point 124 at which the polyurea and the slide-ring molecule 130 are crosslinked.

Figure 23:
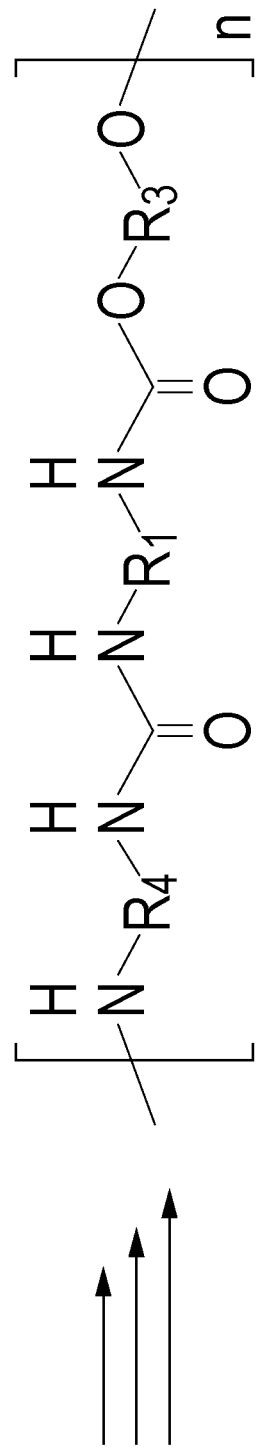
FIG. 23 is a reaction formula of a reaction example when a slide-ring molecule 130 including a polyurethane and an amine group is used in the wall substance 120 of the microcapsule 100 according to the third embodiment of the present invention.

Next, a reaction example when the slide-ring molecule 130 provided with the amine group is introduced into the wall substance 120 using polyurethane will be described by using FIG. 23. FIG. 23 illustrates a reaction formula in which an isocyanate including two isocyanate groups and an $R_1$ group, an alcohol including two hydroxyl groups and an $R_3$ group, and the slide-ring molecule 130 including two amine groups and an $R_4$ group are subjected to addition polymerization. The two amine groups which are bonded to the $R_4$ group are provided in the cyclic molecule 134 illustrated in FIG. 18 and FIG. 19.

As illustrated in FIG. 23, the isocyanate group and the hydroxyl group are subjected to the additive reaction, and the $R_1$ group and the $R_3$ group are connected by the urethane bond. In addition, the isocyanate group and the amine group are subjected to the additive reaction, and the $R_1$ group and the $R_4$ group are connected by the urea bond.

Thus, the isocyanate group and the amine group of the cyclic molecule 134 are subjected to the additive reaction, and the polyurea and the slide-ring molecule 130 are connected by the urea bond. A urea bond portion is the cross-linking point 124 at which the polyurea and the slide-ring molecule 130 are crosslinked.

The cyclic molecule 134 is connected to the polymer chain 122 configuring the wall substance 120 by the urea bond or the urethane bond. Specifically, as illustrated in FIG. 20 to FIG. 23, the cyclic molecule 134 is connected to the $R_1$ group included in the polymer chain 122 by the urea bond or the urethane bond.

Figure 24:
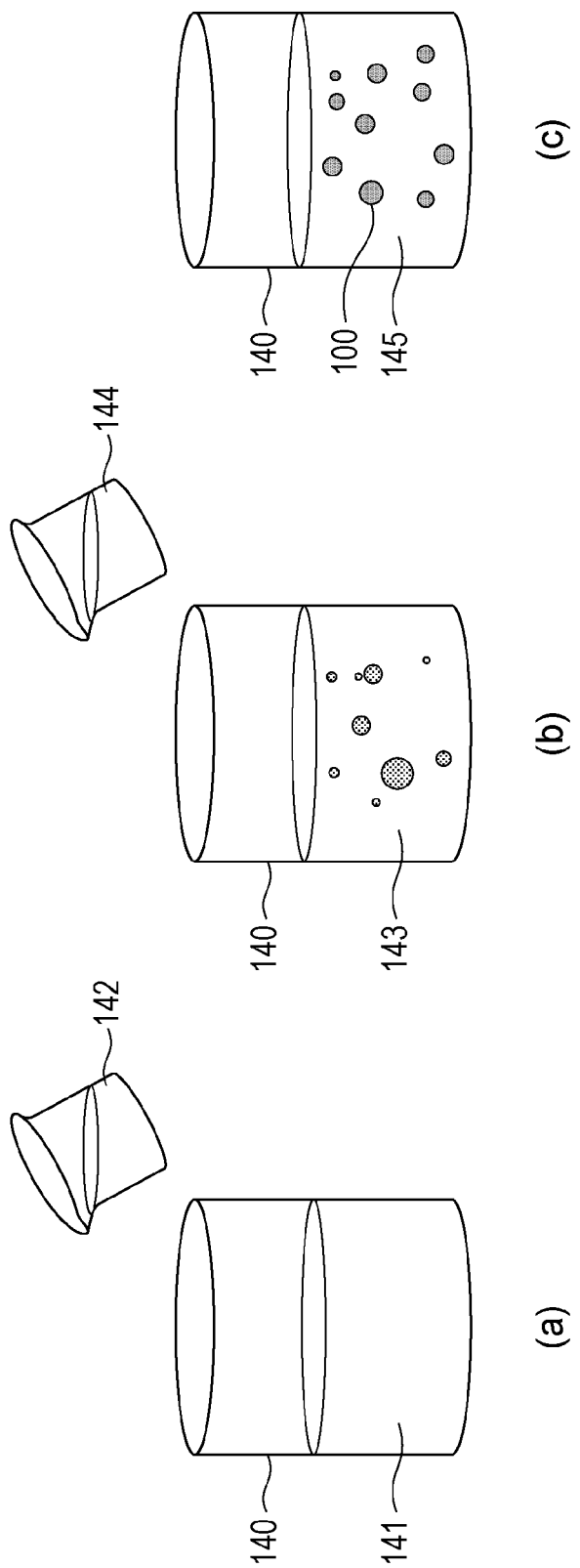
FIG. 24 is a schematic view illustrating a manufacturing method of the microcapsule 100 according to the third embodiment of the present invention using an interfacial polymerization method.
Figure 25:
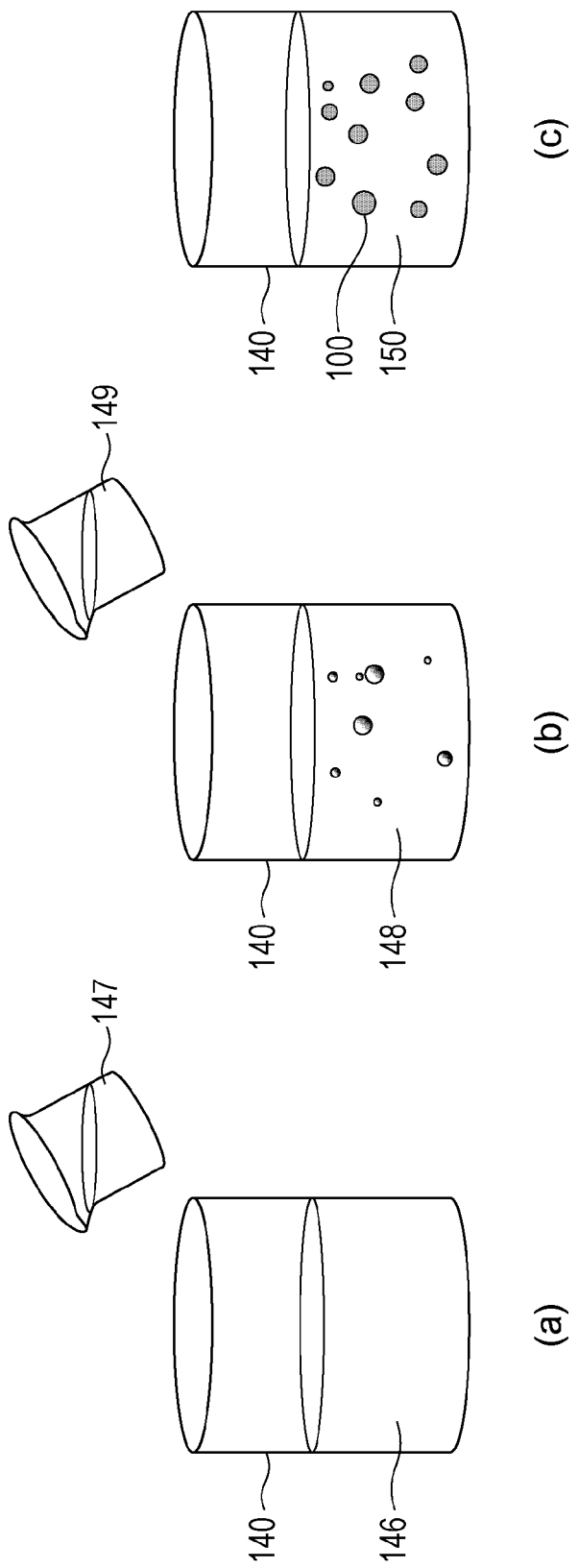
FIG. 25 is a schematic view illustrating a manufacturing method of the microcapsule 100 according to the third embodiment of the present invention using the interfacial polymerization method.
Figure 26:
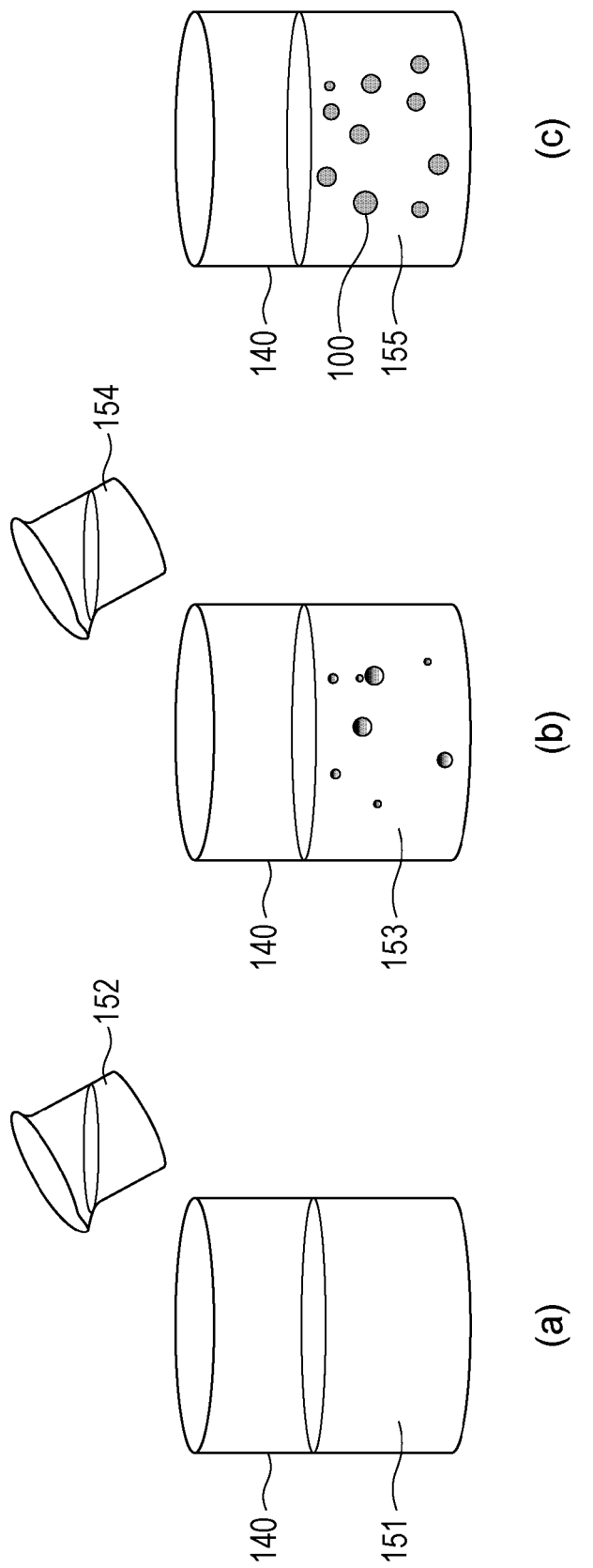
FIG. 26 is a schematic view illustrating a manufacturing method of the microcapsule 100 according to the embodiment using a coacervation method.

Next, a manufacturing method of the microcapsules 100 according to this embodiment will be described by using FIG. 24 to FIG. 26. The microcapsules 100 according to this embodiment are manufactured by a chemical technique or a physical-chemical method. As the chemical technique, an interfacial polymerization method, an interface reaction method, an interface emulsification method, and the like are included. As the physical-chemical method, a coacervation method, an interface gelation reaction method, an electric emulsification method, and the like are included. First, as a manufacturing method of the microcapsules 100 by a chemical technique, the interfacial polymerization method will be described as an example by using FIG. 24 and FIG. 25. FIG. 24 and FIG. 25 are schematic views illustrating the manufacturing method of the microcapsules 100 using the interfacial polymerization method.

First, the manufacturing method of the microcapsules 100 including an oil-soluble organic material in the thermal storage substance will be described by using FIG. 24. First, as illustrated in FIG. 24(a), an oil phase 142 in which the thermal storage substance and isocyanate are dissolved or dispersed is poured into a water phase 141 in the manufacturing container 140, and is violently stirred. Then, as illustrated in FIG. 24(b), an oil-in-water (O/W type) emulsion 143 is obtained. When an aqueous solution 144 in which aqueous amine, or a dihydric alcohol and slide-ring molecules are dissolved or dispersed is poured into the oil-in-water emulsion 143, in the interface between the oil drops and the water phase, the isocyanate dissolved in the oil drops and the amine, or the dihydric alcohol and the slide-ring molecules in the water phase react. According to this reaction, the wall substance is created to surround the oil drop in which the thermal storage substances are dissolved or dispersed. Accordingly, as illustrated in FIG. 24(c), a microcapsule slurry 145 is created. The microcapsule slurry 145 is filtered, and thus the microcapsules 100 are manufactured.

Next, a manufacturing method of the microcapsules 100 including an aqueous inorganic material in the thermal storage substance will be described by using FIG. 25. FIG. 25 is a schematic view illustrating a manufacturing method of the microcapsules 100 using the coacervation method. First, as illustrated in FIG. 25(a), an aqueous solution 147 in which the aqueous thermal storage substance, an amine, or a dihydric alcohol and slide-ring molecules are dissolved or dispersed is poured into an oil phase 146 in the manufacturing container 140, and is violently stirred. Then, as illustrated in FIG. 25(b), a water-in-oil (W/O type) emulsion 148 is obtained. When an oil phase 149 in which isocyanate is dissolved or dispersed is poured into the water-in-oil type emulsion 148, in an interface between water drops and an oil phase, the amine, or the dihydric alcohol and the slide-ring molecules dissolved in the water drops, and the isocyanate in the oil phase react. According to this reaction, the wall substance is created to surround the water drop in which the thermal storage substances are dissolved or dispersed. Accordingly, as illustrated in FIG. 25(c), a microcapsule slurry 150 is created. The microcapsule slurry 150 is filtered, and thus the microcapsules 100 are manufactured.

Next, as a manufacturing method of the microcapsules 100 by a physical-chemical method, the coacervation method will be described as an example by using FIG. 26. FIG. 26 is a schematic view illustrating the manufacturing method of the microcapsule 100 using the coacervation method. First, a substance forming the wall substance is dissolved in an oil phase 151 in the manufacturing container 140 illustrated in FIG. 26(a). In this embodiment, the substance forming the wall substance is a polyurea or a polyurethane into which the slide-ring molecule is introduced. A water phase 152 in which the aqueous thermal storage substance as a core substance is dissolved is poured into the oil phase 151, and is violently stirred. Then, as illustrated in FIG. 26(b), a water-in-oil (W/O type) emulsion 153 is obtained. A poor solvent 154 in which the substance forming the wall substance is not able to be dissolved is poured into the water-in-oil type emulsion 153. Accordingly, the solubility of the substance forming the wall substance is degraded, and thus the substance is precipitated to surround a microwater drop, and a microcapsule slurry 155 is created as illustrated in FIG. 26(c). The microcapsule slurry 155 is filtered, and thus the microcapsules 100 including the aqueous thermal storage substance are manufactured.

In the coacervation method, even when the poor solvent 154 is not poured into the emulsion 153, the microcapsules 100 are able to be created. In this case, when a temperature of the emulsion 153 decreases, and solubility of the substance forming the wall substance decreases, the substance is precipitated to surround the microwater drop. Accordingly, the microcapsules 100 are manufactured.

Here, in PTL 1, microcapsules for heat storage obtained by radical polymerization in which a capsule wall including a thermoplastic resin having a hydrophilic property in the molecule as a main component is formed around the core substance to be the thermal storage substance are described. The microcapsule for heat storage has weak tensile stress in every direction. For this reason, when a volume of the thermal storage substance expands or contracts according to the phase change, the capsule wall is ruptured, and thus the thermal storage substance is leaked.

In addition, in PTL 2, thermal storage material microcapsules which include a thermal storage substance, and use a resin obtained by reacting a multivalent isocyanate compound with a high-molecular-weight amine compound in a microcapsule film are described. In the thermal storage material capsule, there is no countermeasure for the microcapsule film due to volume expansion or volume contraction of the thermal storage substance. In addition, a polyamine is used in the microcapsule film, and thus yellowing due to light occurs.

Thus, in the microcapsules of the related art, when the volume of the thermal storage substance is changed according to the phase change, snagglig of the large molecules configuring the wall substance becomes strong, and the wall substance is damaged.

In contrast, the microcapsules 100 according to this embodiment include the slide-ring molecule 130 introduced into the wall substance 120. The wall substance 120 has a stretch property due to introduction of the slide-ring molecule 130 into a part of the wall substance 120 while a composition of the polyurea or the polyurethane is maintained. For this reason, the microcapsules 100 are able to correspond to a change in shape of the wall substance 120 according to a volume change in the thermal storage substance 110, and it is possible to maintain a network structure of the wall substance 120. Accordingly, a gap by which the wall substance 120 is damaged hardly occurs in the microcapsules 100, and it is possible to prevent the thermal storage substance from leaking.

In addition, the microcapsules 100 are able to be created without using a high-molecular-weight amine in the wall substance 120. For this reason, the microcapsules 100 according to this embodiment are able to prevent yellowing due to light.

In addition, in International Publication No. WO01/083566 of Patent Literature, a crosslinked polyrotaxane in which cyclic molecules are crosslinked is described. However, in this Patent Literature, microcapsules using polyrotaxane (the slide-ring molecule) is not described. The microcapsules 100 according to this embodiment have the slide-ring molecule 130 introduced into the wall substance 120, and thus durability of the wall substance 120 is improved.

A product with a compression set of 0.7% created by the high molecular material into which the slide-ring molecule is introduced is known. On the other hand, a product with a compression set of 30% created by the high molecular material into which the slide-ring molecule is not introduced is known. Thus, by using the high molecular material into which the slide-ring molecule is introduced, it is possible to considerably decrease the compression set. For this reason, even when the volume change in the thermal storage substance 110 is repeated, the microcapsules 100 according to this embodiment are able to correspond to the change in shape in the wall substance 120.

EXAMPLES

Next, the thermal storage material 105 using the microcapsules 100 according to this embodiment will be described. FIG. 27 is a cross-sectional view of the thermal storage material 105 according to this embodiment. As illustrated in FIG. 27, the thermal storage material 105 according to this embodiment includes a container 115, an aqueous inorganic salt solution 118 filled into the container 115, and the microcapsules 100 dispersed in the aqueous inorganic salt solution 118.

The container 115 is a hollow box body having a cuboidal outer shape. The container 115, for example, is formed of a resin material such as ABS or a polycarbonate. The aqueous inorganic salt solution 118 is filled into the container 115. As the aqueous inorganic salt solution 118, for example, a sodium hydroxide aqueous solution, a potassium chloride aqueous solution, a magnesium chloride aqueous solution, an ammonium chloride aqueous solution, a calcium chloride aqueous solution, and the like are used. In the aqueous inorganic salt solution, a plurality of microcapsules 100 is dispersed. In this example, the microcapsules 100 include the thermal storage substance using an organic material which is insoluble in water.

The thermal storage material 105 according to this example includes a plurality of microcapsules 100. Accordingly, in the thermal storage material 105, the thermal conductivity is able to be improved by increasing an exterior surface area. In addition, the slide-ring molecule is introduced into the wall substance of the microcapsules 100. Accordingly, the thermal storage substance included in the microcapsule 100 is able to be prevented from leaking.

The present invention is not limited to the embodiments described above, and is able to be variously modified.

In the thermal storage material 105 of the embodiments described above, the microcapsules 100 are dispersed in the aqueous inorganic salt solution 118, but the present invention is not limited thereto.

For example, the microcapsules may be dispersed in an aqueous solution to which ethylene glycol or polyethylene glycol is added.

In addition, in the thermal storage material 105 of the embodiment described above, the thermal storage substance using the organic material is included in the microcapsules 100, but the present invention is not limited thereto.

For example, the thermal storage substance using the inorganic material may be included in the microcapsules 100.

In addition, the respective embodiments or modification examples are able to be performed by being combined with each other.

INDUSTRIAL APPLICABILITY

The present invention is able to be widely used in the field of latent heat storage members and building materials provided with a latent heat storage member.

In addition, the present invention is able to be widely used in microcapsules including the thermal storage material.

REFERENCE SIGNS LIST 1, 2 wall material
10 heat insulation member
20, 50 latent heat storage member
20a inner side surface
20b outer side surface
30 outer wall material
40 rib
100 microcapsule
105 thermal storage material
110 thermal storage substance
115 container
118 aqueous inorganic salt solution
120 wall substance
122 polymer chain
124 crosslinking point
130 slide-ring molecule
132 linear molecule
134 cyclic molecule
136 blocking group
140 manufacturing container
141, 152 water phase
142, 146, 149, 151 oil phase
143 oil-in-water type emulsion
144, 147 aqueous solution
145, 150, 155 microcapsule slurry
148, 153 water-in-oil type emulsion
154 poor solvent

The invention claimed is:
1. A microcapsule, comprising:
a thermal storage substance which is subjected to a phase change at a predetermined phase change temperature;
a wall substance including the thermal storage substance; and
a slide-ring molecule introduced into the wall substance.

2. The microcapsule according to claim 1,
wherein the slide-ring molecule includes a linear molecule, cyclic molecules performing clathration with respect to the linear molecule, and blocking groups arranged on both terminals of the linear molecule.

3. The microcapsule according to claim 2,
wherein the slide-ring molecule is a polyrotaxane.

4. The microcapsule according to claim 2,
wherein the wall substance is configured of a polyurea or a polyurethane.

5. The microcapsule according to claim 2,
wherein the linear molecule is a polyethylene glycol or a polycaprolactone.

6. The microcapsule according to claim 2,
wherein the cyclic molecule is at least one cyclodextrin selected from α-cyclodextrin, β-cyclodextrin, and γ-cyclodextrin.

7. The microcapsule according to claim 2,
wherein the cyclic molecule is connected to a polymer chain configuring the wall substance by a urea bond or a urethane bond.

8. The microcapsule according to claim 2,
wherein the cyclic molecule includes a hydroxyl group or an amine group.

9. The microcapsule according to claim 1,
wherein as the thermal storage substance, an organic material or an inorganic material is used.

10. A thermal storage material, comprising:
a container;
an aqueous inorganic salt solution filled into the container; and
a microcapsule dispersed in the aqueous inorganic salt solution, the microcapsule comprising:
    a thermal storage substance which is subjected to a phase change at a predetermined phase change temperature;
    a wall substance including the thermal storage substance; and
    a slide-ring molecule introduced into the wall substance.

* * * * *